US011701982B2

(12) United States Patent
Moszynski et al.

(10) Patent No.: US 11,701,982 B2
(45) Date of Patent: Jul. 18, 2023

(54) OPTIMIZATION OF MULTIPLE BATTERY MANAGEMENT FOR ELECTRIC VEHICLE FLEETS

(71) Applicant: Blitz Electric Motors Ltd., Tel Aviv (IL)

(72) Inventors: Raphael Moszynski, Tel Aviv (IL); Guy Cohen, Ramat Gan (IL); Shmuel Ur, Shorashim (IL)

(73) Assignee: Blitz Electric Motors Ltd., Tel Aviv (IL)

(*) Notice: Subject to any disclaimer, the term of this patent is extended or adjusted under 35 U.S.C. 154(b) by 446 days.

(21) Appl. No.: 16/894,807

(22) Filed: Jun. 7, 2020

(65) Prior Publication Data
US 2021/0380013 A1    Dec. 9, 2021

(51) Int. Cl.
| | |
|---|---|
| B60L 53/66 | (2019.01) |
| G06F 21/71 | (2013.01) |
| B60L 53/67 | (2019.01) |
| B60L 53/68 | (2019.01) |
| B60L 58/18 | (2019.01) |
| H02J 7/00 | (2006.01) |
| B60L 50/60 | (2019.01) |
| B60L 53/80 | (2019.01) |
| B60L 53/30 | (2019.01) |

(52) U.S. Cl.
CPC .............. *B60L 53/66* (2019.02); *B60L 50/60* (2019.02); *B60L 53/67* (2019.02); *B60L 53/68* (2019.02); *B60L 53/80* (2019.02); *B60L 58/18* (2019.02); *G06F 21/71* (2013.01); *H02J 7/0013* (2013.01); *H02J 7/00032* (2020.01); *H02J 7/0047* (2013.01); *B60L 53/305* (2019.02)

(58) Field of Classification Search
CPC ...................................................... B60L 53/66
USPC ............................................................ 701/22
See application file for complete search history.

(56) References Cited

U.S. PATENT DOCUMENTS

| | | | |
|---|---|---|---|
| 2012/0136574 A1* | 5/2012 | Kobayashi | G08G 1/09685 701/533 |
| 2013/0226441 A1* | 8/2013 | Horita | B60Q 9/00 701/117 |
| 2015/0019132 A1* | 1/2015 | Gusikhin | G06Q 10/047 701/400 |
| 2018/0045533 A1* | 2/2018 | Jackson | B60L 58/12 |
| 2019/0207267 A1* | 7/2019 | Vickery | B60L 53/66 |
| 2019/0241090 A1* | 8/2019 | Wakitani | H02J 7/0013 |
| 2020/0011687 A1* | 1/2020 | Lindemann | G07C 5/02 |
| 2020/0130511 A1* | 4/2020 | Botts | H01M 10/0525 |

\* cited by examiner

*Primary Examiner* — Edward Tso
*Assistant Examiner* — Ahmed H Omar

(57) ABSTRACT

Provided herein are system, methods and apparatuses for controlling replaceable rechargeable batteries powering and an electric vehicle, comprising, receiving battery utilization instructions computed by a remote battery management system for using and/or recharging each of a plurality of replaceable rechargeable batteries installed in an electric vehicle for powering the electric vehicle, and controlling one or more switching circuits configured to electrically couple or de-couple each of the plurality of batteries to each other and/or to an engine of the electric vehicle according to the received battery utilization instructions to use and/or recharge the respective battery.

27 Claims, 12 Drawing Sheets

OPTIMIZATION OF MULTIPLE BATTERY MANAGEMENT FOR ELECTRIC VEHICLE FLEETS

BACKGROUND

The present invention, in some embodiments thereof, relates to managing batteries of electric vehicles, and, more specifically, but not exclusively, to using local battery controllers deployed in electric vehicles to optimize utilization of the batteries of the electric vehicles.

Electric vehicles have become extremely popular in recent years in a plurality of markets and for a plurality of applications, ranging from transportation, through delivery services to agricultural, environmental, municipal and other applications. This rapid growth is due to many advantages the electric vehicles may present for example, reduced energy cost, clean and renewable energy solution, environmental friendly operation, light weight solution and many more.

As such, multiple operators, for example, companies, organizations and/or institutions may own, operate and/or utilize large fleets of electric vehicles used to carry out the service, platform and/or application provided by the operators.

The electric vehicles are typically powered by rechargeable batteries which are typically recharged offline in charging stations. The operators may therefore typically need to deploy major charging sites hosting a plurality of charging stations to support the operation of the fleet of electric vehicles.

SUMMARY

According to a first aspect of the present invention there is provided a battery controller of an electric vehicle, configured for:
  Receiving battery utilization instructions computed by a remote battery management system for using and/or recharging each of a plurality of replaceable rechargeable batteries installed in an electric vehicle for powering the electric vehicle.
  Controlling one or more switching circuits configured to electrically couple or de-couple each of the plurality of batteries to each other and/or to an engine of the electric vehicle according to the received battery utilization instructions to use and/or recharge the respective battery.

According to a second aspect of the present invention there is provided a method of controlling replaceable rechargeable batteries of an electric vehicle, comprising using a battery controller of an electric vehicle for:
  Receiving battery utilization instructions computed by a remote battery management system for using and/or recharging each of a plurality of replaceable rechargeable batteries installed in an electric vehicle for powering the electric vehicle.
  Controlling one or more switching circuits configured to electrically couple or de-couple each of the plurality of batteries to each other and/or to an engine of the electric vehicle according to the received battery utilization instructions to use and/or recharge the respective battery.

According to a third aspect of the present invention there is provided a method of optimizing utilization of electric vehicles batteries, comprising using one or more processors for:
  Receiving a travel plan of each of a plurality of electric vehicles of a fleet defining at least a route and a scheduled time of each trip assigned for the respective electric vehicle during a certain time period. Each electric vehicle is powered by a set of replaceable rechargeable batteries installed in the respective electric vehicle. Each of the batteries of the set is rechargeable in each of a plurality of charging sites.
  Receiving real-time battery status of each of a plurality of batteries installed in the plurality of electric vehicles or recharged at each of the plurality of charging sites.
  Computing battery utilization instructions for using or recharging each of the plurality of batteries based on the travel plan and the battery status to optimize utilization of at least some of the plurality of batteries.
  Transmitting the battery utilization instructions.

According to a fourth aspect of the present invention there is provided a system for securely processing encrypted private data, comprising one or more processors executing a code. The code comprising:
  Code instructions to receive a travel plan of each of a plurality of electric vehicles of a fleet defining at least a route and a scheduled time of each trip assigned for the respective electric vehicle during a certain time period. Each electric vehicle is powered by a set of replaceable rechargeable batteries installed in the respective electric vehicle. Each of the batteries of the set is rechargeable in each of a plurality of charging sites.
  Code instructions to receive real-time battery status of each of a plurality of batteries installed in each of the plurality of electric vehicles or recharged at each of the plurality of charging sites.
  Code instructions to compute battery utilization instructions for using or recharging each of the plurality of batteries based on the travel plan and the battery status to optimize utilization of at least some of the plurality of batteries.
  Code instructions to transmit the battery utilization instructions.

According to a fifth aspect of the present invention there is provided a method of optimizing deployment of replaceable rechargeable batteries powering a fleet of electric vehicles, comprising using one or more processors for:
  Receiving an estimated travel plan defining an expected number of trips planned for a plurality of electric vehicle, a route of each trip, a schedule of each trip over a predefined time period, and a location of one or more charging sites.
  Computing an optimal battery deployment configuration of a plurality of replaceable rechargeable batteries interchangeable between at least some of the plurality of electric vehicles which are required to power the plurality of electric vehicles operated according to the estimated travel plan by applying one or more optimization functions configured to optimize one or more variables defining the battery deployment configuration in order to reduce an overall cost of the battery deployment configuration. The one or more variables comprising: a number of replaceable rechargeable batteries and a number of chargers in each charging site.
  Outputting the number of replaceable rechargeable batteries and the number of chargers determined for the optimal battery deployment configuration.

According to a sixth aspect of the present invention there is provided a system for optimizing deployment of replaceable rechargeable batteries powering a fleet of electric vehicles, comprising one or more processors executing a code. The code comprising:

Code instructions to receive an estimated travel plan defining an expected number of trips planned for a plurality of electric vehicle, a route of each trip, a schedule of each trip over a predefined time period, and a location of one or more charging sites.

Code instructions to compute an optimal battery deployment configuration of a plurality of replaceable rechargeable batteries interchangeable between at least some of the plurality of electric vehicles which are required to power the plurality of electric vehicles operated according to the estimated travel plan by applying one or more optimization functions configured to optimize one or more variables defining the battery deployment configuration in order to reduce an overall cost of the battery deployment configuration. The one or more variables comprising: a number of replaceable rechargeable batteries and a number of chargers in each charging site.

Code instructions to output the number of replaceable rechargeable batteries and the number of chargers determined for the optimal battery deployment configuration.

In a further implementation form of the first and/or second aspects, the battery utilization instructions received for using a respective battery include instructions to use the respective battery for powering the electric vehicle according to one or more usage rules.

In a further implementation form of the first and/or second aspects, the battery utilization instructions received for recharging a respective battery include instructions to recharge the respective battery from one or more of the other batteries according to one or more charging rules.

In a further implementation form of the first and/or second aspects, the battery utilization instructions received for recharging a respective battery include instructions to recharge the respective battery from an engine of the electric vehicle.

In a further implementation form of the first and/or second aspects, the battery utilization instructions comprise respective instructions for each of the plurality of batteries.

In an optional implementation form of the first and/or second aspects, real-time battery status information collected for each of the plurality of batteries installed in the electric vehicle is transmitted to the battery management system which is configured to adjust the battery utilization instructions based on the real-time battery status.

In a further implementation form of the third, fourth, fifth and/or sixth aspects, at least some of the plurality of batteries can be installed in at least some of the plurality of electric vehicles.

In a further implementation form of the third, fourth, fifth and/or sixth aspects, one or more of the plurality of batteries are rechargeable while installed in a respective electric vehicle from one or more of: one or more other batteries installed in the same respective electric vehicle and from an engine of the electric vehicle.

In a further implementation form of the third, fourth, fifth and/or sixth aspects, each of the plurality of electric vehicles comprises a local battery controller configured to control usage and recharging of each battery of the set installed in the respective electric vehicle.

In a further implementation form of the third and/or fourth aspects, the battery utilization instructions computed for using a respective battery include one or more of: instructions to install the respective battery in one of the plurality of electric vehicles, and instructions to use the respective battery according to one or more usage rules.

In a further implementation form of the third and/or fourth aspects, the battery utilization instructions computed for recharging a respective battery include one or more of: instructions indicating one of the plurality of charging sites selected to for recharging the respective battery, instructions indicating a respective charger in the selected charging site selected to recharge the respective battery, instructions to recharge the respective battery from one or more other batteries installed in the same electric vehicle, instructions to recharge the respective battery from an engine of a respective electric vehicle, instructions for recharging the respective battery according to one or more charging rules and/or the like.

In an optional implementation form of the third and/or fourth aspects, the battery utilization instructions further comprise instructions to transfer one or more of the plurality of batteries from one of the plurality of charging sites to another one of the plurality of charging sites.

In a further implementation form of the first, second, third and/or fourth aspects, updated battery utilization instructions are computed upon reception of updated battery status of one or more of the plurality of batteries.

In a further implementation form of the third and/or fourth aspects, each of the plurality of trips starts in one of the plurality of charging sites and ends in one of the plurality of charging sites.

In a further implementation form of the third, fourth, fifth and/or sixth aspects, the optimized utilization of at least some of the plurality of batteries comprises one or more of: reduced number of recharge cycles of one or more of the plurality of batteries, not exceeding a maximum voltage level in one or more of the plurality of batteries, not exceeding a minimum voltage level in one or more of the plurality of batteries, reducing a maintenance cost of the plurality of batteries and/or the like.

In an optional implementation form of the third and/or fourth aspects, the battery utilization instructions computed for one or more of the plurality of batteries are adjusted based on one or more driving patterns of one or more of the plurality of electric vehicles.

In an optional implementation form of the third and/or fourth aspects, the battery utilization instructions computed for one or more of the plurality of batteries are adjusted based on one or more traffic conditions reported along a route of one or more trips assigned to one or more of the plurality of electric vehicles.

In an optional implementation form of the third and/or fourth aspects, the battery utilization instructions computed for one or more of the plurality of batteries are adjusted based on availability of maintenance personnel capable to apply the battery utilization instructions.

In an optional implementation form of the third and/or fourth aspects, the battery utilization instructions computed for one or more of the plurality of batteries are adjusted based on one or more energy consumption parameters of the power source in one or more of the plurality of charging sites.

In an optional implementation form of the third and/or fourth aspects, the battery utilization instructions computed for one or more of the plurality of batteries are adjusted based on one or more environmental conditions reported for a geographical area of one or more trips assigned to one or more of the plurality of electric vehicles.

In an optional implementation form of the third and/or fourth aspects, the battery utilization instructions computed for one or more of the plurality of batteries are adjusted based on one or more operational parameters of one or more of the batteries learned using one or more Machine Learning (ML) models applied to the real-time status information of the one or more batteries.

In a further implementation form of the first, second, third, fourth, fifth and/or sixth aspects, each of the plurality of electric vehicles is a member of a group consisting of: a ground vehicle, an aerial vehicle and a naval vehicle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
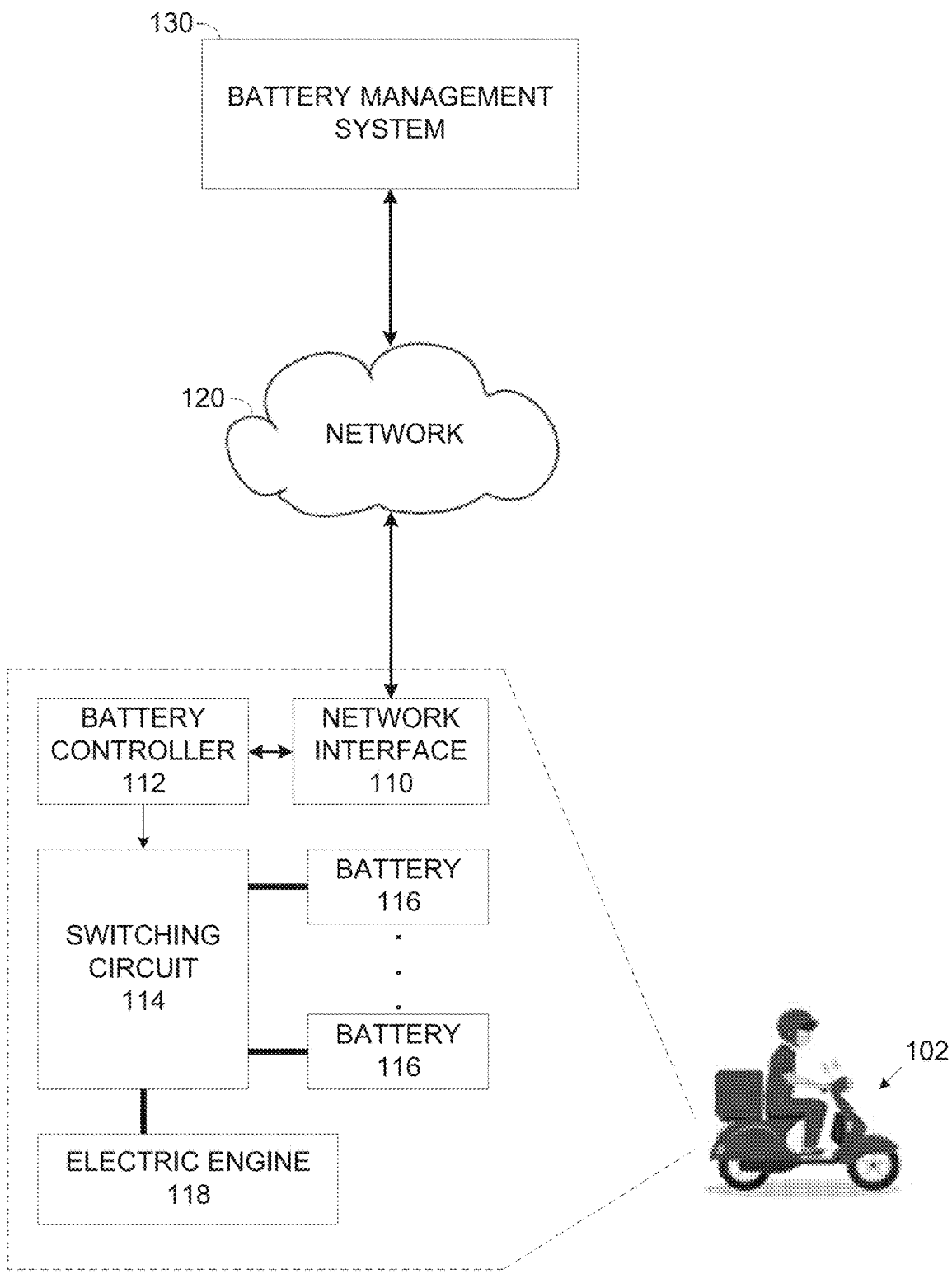
FIG. 1 is a schematic illustration of an exemplary battery controller of an electric vehicle operated to optimize utilization of rechargeable batteries powering the electric vehicle, according to some embodiments of the present invention.

The present invention, in some embodiments thereof, relates to managing batteries of electric vehicles, and, more specifically, but not exclusively, to using local battery controllers deployed in electric vehicles to optimize utilization of the batteries of the electric vehicles.

According to some embodiments of the present invention, there are provided systems, methods and computer program products for using a local battery controller installed in an electric vehicle to control multiple rechargeable batteries installed in the electric vehicle to power one or more electric engines of the electric vehicle.

The electric vehicle, for example, a ground vehicle (e.g. car, scooter, bicycle, train, etc.), an aerial vehicle (e.g. drone, Unmanned Aerial Vehicle (UAV), aircraft, etc.), a naval vehicle (e.g. boat, submarine, etc.) may be powered at least partially by the electric engine.

The battery controller may control one or more switching circuits which may electrically couple and/or decouple each of the rechargeable batteries installed in the vehicle to the electric engine and/or to one or more of the other rechargeable batteries installed in the (same) electric vehicle. The battery controller may therefore control the switching circuit(s) to connect one or more of the rechargeable batteries to power the electric engine. The battery controller may further control the switching circuit(s) to connect one or more of the rechargeable batteries to one or more of the other rechargeable batteries installed in the electric vehicle to recharge the respective rechargeable battery(s) from the other rechargeable battery(s). Moreover, the battery controller may control the switching circuit(s) to connect one or more of the rechargeable batteries to the electric engine to recharge the respective rechargeable battery(s) from the electric engine. Furthermore, the battery controller may control the switching circuit(s) to connect one or more of the rechargeable batteries to an external power supply circuit which may be connected to the electric vehicle while parked to recharge the respective rechargeable battery(s) from the external power supply.

The battery controller may connect to one or more communication interfaces of the electric vehicle, for example, a wireless communication interface, a cellular interface and/or the like and may communicate with one or more remote systems, for example, a battery management system and/or the like.

The battery controller may receive, from the battery management system, battery utilization instruction instructing the battery controller how to use and/or recharge each of the rechargeable batteries installed in the electric vehicle. For example, the battery utilization instruction may indicate using one or more certain rechargeable batteries installed in the electric vehicle to power the electric engine, optionally according to a certain usage pattern (e.g. a certain energy consumption threshold, a certain current level, etc.). In another example, the battery utilization instruction may indicate recharging one or more of the rechargeable batteries from one or more of the other rechargeable batteries installed in the electric vehicle and/or from the electric engine optionally according to a certain recharge pattern (e.g. a certain recharge time, a certain recharge current level, a certain recharge rate, etc.).

The battery controller may then operate the switching circuit(s) accordingly to apply the battery utilization instructions received from the remote battery management system. In case the battery controller does not receive battery utilization instructions from the battery management system the battery controller may then operate the switching circuit to control the rechargeable batteries according to a default utilization procedure.

According to some embodiments of the present invention, there are provided systems, methods and computer program products for computing battery utilization instructions for a plurality of rechargeable batteries used to power a fleet comprising a plurality of electric vehicles operated according to a predefined travel plan in order to optimize utilization of the plurality of rechargeable batteries. In particular, at least some of the electric vehicles of the fleet are capable to host multiple rechargeable batteries which may be interchangeable between the electric vehicles and further include the battery controller configured to control usage and/or recharge of the multiple rechargeable batteries installed in the electric vehicle.

The battery utilization instructions may be computed for the plurality of electric vehicles, for example, by the battery management system, based on a predefined travel plan. The travel plan may define the resources available to the fleet, for example, number of available electric vehicles, battery capacity of each electric vehicle, number of available rechargeable batteries, number of available chargers, recharging capacity of each charger, number of charging sites serving the fleet, location of the charging sites, deployment of the chargers in the charging site(s) and/or the like. There may be several types of rechargeable batteries, and in such case the travel plan may define one or more of the operational parameters of each of the rechargeable battery types, for example, maximum energy capacity, nominal voltage, nominal current, typical charging time and/or the like.

The travel plan may further define a work assignment (work load) planned for the fleet for a certain future time period, for example, a day, a week, a month and/or the like, specifically, a plurality of trip that need to be conducted by the electric vehicles during the future time period, for example, food delivery trips, postal items delivery trips, item and/or material distribution trips and/or the like. Each of the trips may be defined by trip parameters comprising at least a route of the trip and scheduled time of the trip. However, the trip parameters of one or more of the trip may further include additional parameters, for example, a cargo weight estimated for the trip, one or more stops planned along the trip and/or the like.

The battery management system may analyze the travel plan and identify one or more resource allocation configurations for allocating the resources, specifically allocating the electric vehicles to conduct the plurality of trips defined by the travel plan, allocating the rechargeable batteries to power the electric vehicles accordingly, allocating the chargers to charge at least some of the rechargeable batteries and/or the like. In particular, the battery management system may optimize one or more of the resource allocation configurations according to one or more objective functions to optimize a battery utilization of the plurality of rechargeable batteries used by the fleet of electric vehicles. The optimal battery utilization may be expressed by one or more parameters, for example, reduced cost of the energy used by the fleet from the rechargeable batteries, increased battery longevity (life expectancy), reduced battery maintenance cost and/or the like. The optimization may be based on effectively allocating the rechargeable batteries to the electric vehicles, operating the rechargeable batteries within their nominal operational values, reducing recharging cycles and/or the like.

The battery management system may then select the resource allocation configuration presenting the optimal battery utilization and may compute battery utilization instructions accordingly, i.e., battery utilization instructions which apply the selected resource allocation configuration.

Optionally, the battery management system may adjust the battery utilization instructions according to one or more conditions, parameters, attributes and/or characteristics estimated for one or more of the trips defined by the travel plan. In particular, the battery management system may adjust the battery utilization instructions according to adjusted energy consumption requirements received for one or more of the electric vehicles 102. The adjusted energy consumption requirements may be generated and provided to the battery management system by a logistics system operating the fleet of electric vehicle. For example, the battery management system may adjust the battery utilization instructions according to updated energy consumption requirements generated by the logistics system based on a driving pattern of one or more of the drivers and/or operators assigned to operate one or more of the electric vehicles in one or more of the trips. In another example, the battery management system may adjust the battery utilization instructions according to updated energy consumption requirements generated by the logistics system based on one or more traffic conditions estimated in the geographical area of one or more of the trips. In another example, the battery management system may adjust the battery utilization instructions according to updated energy consumption requirements generated by the logistics system based on one or more environmental conditions estimated in the geographical area of one or more of the trips.

Optionally, the battery management system may adjust the battery utilization instructions according to battery usage, charging patterns and/or one or more of the operational parameters typical to one or more of the rechargeable batteries which are learned for the respective rechargeable battery(s) over time.

The battery management system may then transmit the battery utilization instructions to the battery controller deployed in each of the plurality of electric vehicles of the fleet. The battery controller of each electric vehicle may thus control the utilization of the rechargeable batteries installed the respective electric vehicle according to the battery utilization instructions received from the battery management system.

In real-time while the electric vehicles of the fleet are operated to conduct the trips defined by the travel plan, the battery management system may receive real-time battery status information from the battery controllers deployed in the plurality of electric vehicles. The battery status may include, for example, an operational state of each of the rechargeable batteries installed in the respective electric vehicle, an energy level of each rechargeable battery, a usage pattern, a recharge pattern and/or the like.

The battery management system may adjust the battery utilization instructions according to the received battery data. For example, in case a certain rechargeable battery installed in a certain electric vehicle is reported to be faulty or nearly drained, the battery management system may adjust the battery utilization instructions to instruct the battery controller of the certain electric vehicle to power the electric engine of the certain electric vehicle from one or more of the other rechargeable battery(s) installed in the certain electric vehicle.

The battery management system may further adjust the battery utilization instructions according to information relating to one or more of the trips receive in real-time from one or more sources, for example, the electric vehicles, online traffic monitoring systems, online weather systems and/or service and/or the like. In particular, the battery management system may adjust the battery utilization instructions according to adjusted energy consumption requirements received from the logistics system. For example, assuming the logistics system receives a real-time report of an accident in a certain location inducing heavy traffic conditions in the certain region. Further assuming that the logistics system determines that the accident and the heavy traffic may impact one or more of the trips in the certain region and scheduled for the current time and/or for the immediate future (e.g. 5 minutes, 15 minutes, 30 minutes, etc.). In such case, since the affected trip(s) may be prolonged and draw more energy from one or more rechargeable batteries of the electric vehicles conducting the affected trip(s), the logistics system may transmit updated energy consumption requirements to the to the battery management system which may adjust the battery utilization instructions for one or more rechargeable batteries installed in electric vehicles conducting the affected trips. For example, the adjusted battery utilization instructions may instruct using the respective rechargeable battery(s) according to a conservative energy budget (e.g. lower speed, less power, etc.) to preserve battery energy to last for the entire trip.

The battery management system may transmit the adjusted and/or updated battery utilization instructions to the battery controllers deployed in one or more of the electric vehicles which may control the utilization of the rechargeable batteries installed the respective electric vehicle according to the adjusted battery utilization instructions.

The battery management system may continuously, periodically and/or per trigger event adjust the battery utilization instructions according to newly received real-time battery status information and/or trip information.

According to some embodiments of the present invention, there are provided systems, methods and computer program products for optimizing a battery deployment configuration of replaceable rechargeable batteries required to power a fleet of electric vehicles assigned to carry out an estimate travel plan (work assignment) defining a plurality of trips that need to be conducted by a predefined number of electric vehicles of the fleet served by a predefined number of charging sites (at known locations). Specifically, the optimal battery deployment configuration may define a number of rechargeable batteries and a number of chargers which are predicted to be sufficient to power the electric vehicles of the fleet in order to successfully accomplish the trips at a lowest cost.

One or more battery deployment configurations may be computed, explored and/or otherwise identified, for example, by the battery management system, similarly to the way the resource allocation configurations are identified with a major difference that the number of rechargeable batteries and the number of chargers which is defined by the travel plan is not defined by the estimated travel plan and is hence free to manipulate. The battery management system may therefore explore a plurality of suitable battery deployment configurations each defining a different number of rechargeable batteries and/or chargers which are determined to be sufficient to successfully power the electric vehicles to accomplish the trips defined by the estimated travel plan.

As described for the resource allocation configurations, the battery management system may optimize one or more of the battery deployment configurations according to one or more objective functions to optimize a battery utilization of the plurality of rechargeable batteries used by the fleet of electric vehicles, specifically to reduce a cost of the battery deployment configuration(s), for example, minimal overall cost of the battery deployment configuration(s) during a certain time period, minimal initial purchase and/or deployment cost, minimal maintenance cost and/or the like.

The battery management system may compute and/or identify an optimal battery deployment configuration which present a lowest cost while capable to support the fleet of electric vehicles to accomplish the trips defined by the estimated travel plan. The battery management system may then output the number of rechargeable batteries and the number of chargers specified by the optimal battery deployment configuration. This information, i.e., the number of rechargeable batteries and the number of chargers may be used to equip and support the fleet to operate according to the estimated travel plan.

Actively controlling multiple rechargeable batteries installed in electric vehicles and optimizing the battery utilization of rechargeable batteries may present major benefits and advantages compared to existing methods and systems for powering electric vehicles.

First, some of the existing methods may apply a basic and very simple usage pattern for rechargeable batteries installed in electric vehicles. Such basic usage patterns may typically translate to providing the electric engine the energy requested by the electric engine. This means that the basic usage pattern is not really a pattern but rather a responsive energy consumption pattern which is essentially dictated by the driver operating the electric engine which may frequently be a most inefficient energy consumption. As such the existing methods have no control over the energy drawn from the rechargeable batteries which may present major limitations.

One major limitation of the existing methods is that there may be no way to predict or plan future battery utilization of the rechargeable batteries which may result in significantly increased costs, essential need for an excessive number of rechargeable batteries to compensate for the inability to plan ahead and/or the like. For example, assuming a certain vehicle is installed with two rechargeable batteries each storing 4 energy charges where an energy charge is regarded as a certain amount of energy. Further assuming the electric vehicle is planned to make three trips each requiring three energy charges. In case of no future battery utilization planning, the electric vehicle may utilize the 6 out of the 8 energy charges available from the two rechargeable batteries for the first two trips and will not have sufficient energy to make the third trip. However, by planning ahead, the electric vehicle may be instructed to utilize 3 energy charges from a first rechargeable battery for the first trip and at the end of the first trip the used rechargeable battery may be removed and put to recharge by a charger in a charging site. The electric vehicle may be further instructed to utilize 3 energy charges from a second rechargeable battery for the second trip. At the end of the first rechargeable battery may be sufficiently charged (e.g. 3 energy charges) and may be installed back in the electric vehicle to be used for the third trip.

In another example, assuming the battery management system estimates that a certain rechargeable battery installed in a certain electric vehicle will last until night, i.e., until the electric vehicle completes its scheduled trips. In such case the battery management system may decide that the certain rechargeable battery should not be replaced and may generate battery utilization instructions accordingly. However, in case the battery management system estimates that the certain rechargeable battery will not last until night, the battery management system may identify a most convenient time for recharging the certain rechargeable battery and may generate battery utilization instructions accordingly. Moreover, since the certain electric vehicle may be installed with multiple rechargeable batteries, the battery management system may distinguish between the rechargeable batteries to determine which of them needs to be replaced and may generate battery utilization instructions accordingly to instruct a time for replacing a certain one of the rechargeable batteries, and until that time instruct using the certain rechargeable batteries to drain it before recharged. As such the other rechargeable batteries installed in the electric vehicle may be fully charged and available for further trips. Furthermore, since there may be different types of rechargeable batteries having different operational parameters, the battery management system may generate the battery utilization instructions to accommodate the capabilities of each battery type.

Another limitation may relate to the fact that the rechargeable batteries may be used such that they exceed their nominal operational parameters which may damage the rechargeable batteries and/or significantly reduce their longevity thus further increasing the operational costs for operating the electric vehicles. In contrast, the battery controller may actively control the rechargeable batteries according to the battery utilization instructions computed by the battery management system to efficiently and effectively power the electric vehicles to successfully accomplish the work load (trip) defined by the travel plan. As the rechargeable batteries are used according to the battery utilization instructions, the battery utilization, in terms of cost, battery degradation, battery longevity and/or the like may be optimized thus significantly reducing cost, reducing maintenance effort, increasing battery utilization.

Moreover, most of the existing systems for powering electric vehicles utilize a single rechargeable battery per electric vehicle, mainly low cost electric vehicles, such as, for example, bicycles, scooters, drones and/or the like but also higher cost electric vehicles, such as, for example, cars, trucks, trains and/or the like. Using a single rechargeable battery may obviously significantly limit the ability to manage plan and/or maintain an effective usage and recharge plans for the rechargeable batteries. Moreover, while some of the existing methods may use multiple rechargeable batteries to power an electric vehicle, these rechargeable batteries are still used according to the basic usage pattern responsive to the demand of the electric engine. On top of that, the multiple rechargeable batteries may not be recharged while installed in the electric vehicle. Deploying multiple rechargeable batteries in each electric vehicle which are controlled by the battery controller of the electric vehicle may overcome these limitations since the battery controller may operate the switching circuits to select which of the batteries may power the electric vehicle at any given time and optionally according to a certain usage pattern, which of the rechargeable batteries is recharged at any given time optionally according to a certain charging pattern and/or the like. This may significantly improve the battery utilization of the batteries which may significantly reduce cost, maintenance effort and/or the like.

Furthermore, while applying the battery utilization instructions to control the battery utilization of the rechargeable batteries of a single electric vehicle may provide significant benefits, computing the battery utilization instructions for the entire fleet of electric vehicles may dramatically boost these benefits as they may apply to all the electric vehicles of the fleet which may add up to a very large number of vehicles. Moreover, since the battery management system computes the battery utilization instructions for the entire fleet, the battery management system having the complete big picture may optimize the allocation of resources (vehicles, batteries, chargers, etc.) and their assignments to complete the trips in a most efficient and cost effective manner. Furthermore, since the rechargeable batteries are replaceable and swappable between at least some of the electric vehicles of the fleet, the battery management system may compute the battery utilization instructions to further optimize the battery utilization by swapping rechargeable batteries between the electric vehicles of the fleet to efficiently accommodate the travel plan (work assignment).

In addition, applying the battery management system to compute the battery deployment configuration predicted to successfully support a fleet assigned with an estimated work load (trips) may yield a highly optimal battery deployment configuration which may significantly reduce cost of the battery deployment configuration, for example, overall cost, material cost (of the rechargeable batteries and the chargers), initial deployment cost (to install the rechargeable batteries and chargers), maintenance cost, energy cost and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The computer readable program instructions may be further executed as one or more web and/or cloud based applications either connected or disconnected to the internet in real-time. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary battery controller of an electric vehicle operated to optimize utilization of rechargeable batteries powering the electric vehicle, according to some embodiments of the present invention.

An exemplary electric vehicle 102, for example, a ground vehicle (e.g. car, scooter, bicycle, train, etc.), an aerial vehicle (e.g. drone, Unmanned Aerial Vehicle (UAV), aircraft, etc.), naval vehicle (e.g. boat, submarine, etc.) may be powered at least partially by a plurality of rechargeable batteries 116. In particular, an electric engine 118 of the electric vehicle 102 may be may be powered by the plurality of rechargeable batteries 116.

Moreover, the rechargeable batteries 116 may be replaceable, meaning that each of the rechargeable batteries 116 may be easily pulled out from the electric vehicle 102 and replaced with another rechargeable battery 116. While it is possible that one rechargeable battery 116 may be installed in the electric vehicle 102, in order to optimize utilization of the rechargeable batteries 116, the electric vehicle 102 is typically installed with multiple rechargeable batteries 116, for example, two batteries, three batteries or even more.

A battery controller 102 may be deployed in the electric vehicle 102 to control the rechargeable batteries 116, for example, use one or more of the rechargeable batteries 116 to power the electric vehicle, recharge one or more of the rechargeable batteries 116 and/or the like. In particular, the battery controller 112 may control a switching circuit 114 comprising one or more switches configured to electrically couple or de-couple each of the rechargeable batteries 116 to one or more of the other rechargeable batteries 116 and/or to the electric engine 118.

The battery controller 112 may be utilized using one or more functional modules each implemented through one or more software modules, one or more hardware modules and/or a combination thereof. For example, the battery controller 112 may comprise one or more processors and/or controllers capable of executing one or more software modules, for example, a process, a script, an application, an agent, a utility, a tool and/or the like each comprising program instructions stored in a non-transitory medium (program store), for example, a Read Only Memory (ROM), a Flash array, a solid state drive and/or the like. In another example, the battery controller 112 may comprise one or more of the hardware modules (elements), for example, a circuit, a component, an Integrated Circuit (IC), an Application Specific Integrated Circuit (ASIC), a Field Programmable Gate Array (FPGA), a Digital Signals Processor (DSP) and/or the like.

The battery controller 112 may be functionally coupled to a network interface 110 deployed in the electric vehicle 102 via one or more wired and/or wireless interfaces, for example, a Universal Serial Bus (USB) interface, a serial interface, a Radio Frequency (RF) interface, a Bluetooth interface and/or the like. The network interface 110 may comprise one or more wireless network interfaces, for example, a Wireless Local Area Network (WLAN, e.g. Wi-Fi) interface, a cellular interface, a Radio Frequency (RF) interface and/or the like for connecting to a network 120.

The network 120 may include one or more wired and/or wired networks, for example, a Local Area Network (LAN), a WLAN, a Wide Area Network (WAN), a Municipal Area Network (MAN), a cellular network, the internet and/or the like.

Via the network interface 110, the battery controller 112 may communicate with one or more remote battery management systems 130, for example, a server, a computing node, a cluster of computing nodes, and/or the like. For example, the battery controller 112 may communicate with one or more of the battery management systems 130 to receive battery utilization instructions for controlling one or more of the rechargeable battery 116. In another example, the battery controller 112 may transmit status information of one or more of the rechargeable battery 116 to one or more of the battery management systems 130.

The electric vehicle 102 presented in the FIG. 1, as well as in one or more additional figures herein after, is an electric scooter which may be part of a fleet of electric vehicles 102, for example, a fleet of electric scooters. This, however, should not be construed as limiting, since the same architecture, concepts and functional elements may apply to any other electric vehicle 102 powered by multiple rechargeable batteries such as the rechargeable battery 116. Moreover, the same architecture, concepts and functional elements may apply to fleets comprising different electric vehicles 102 at least partially powered by the same rechargeable battery 116.

Figure 2:
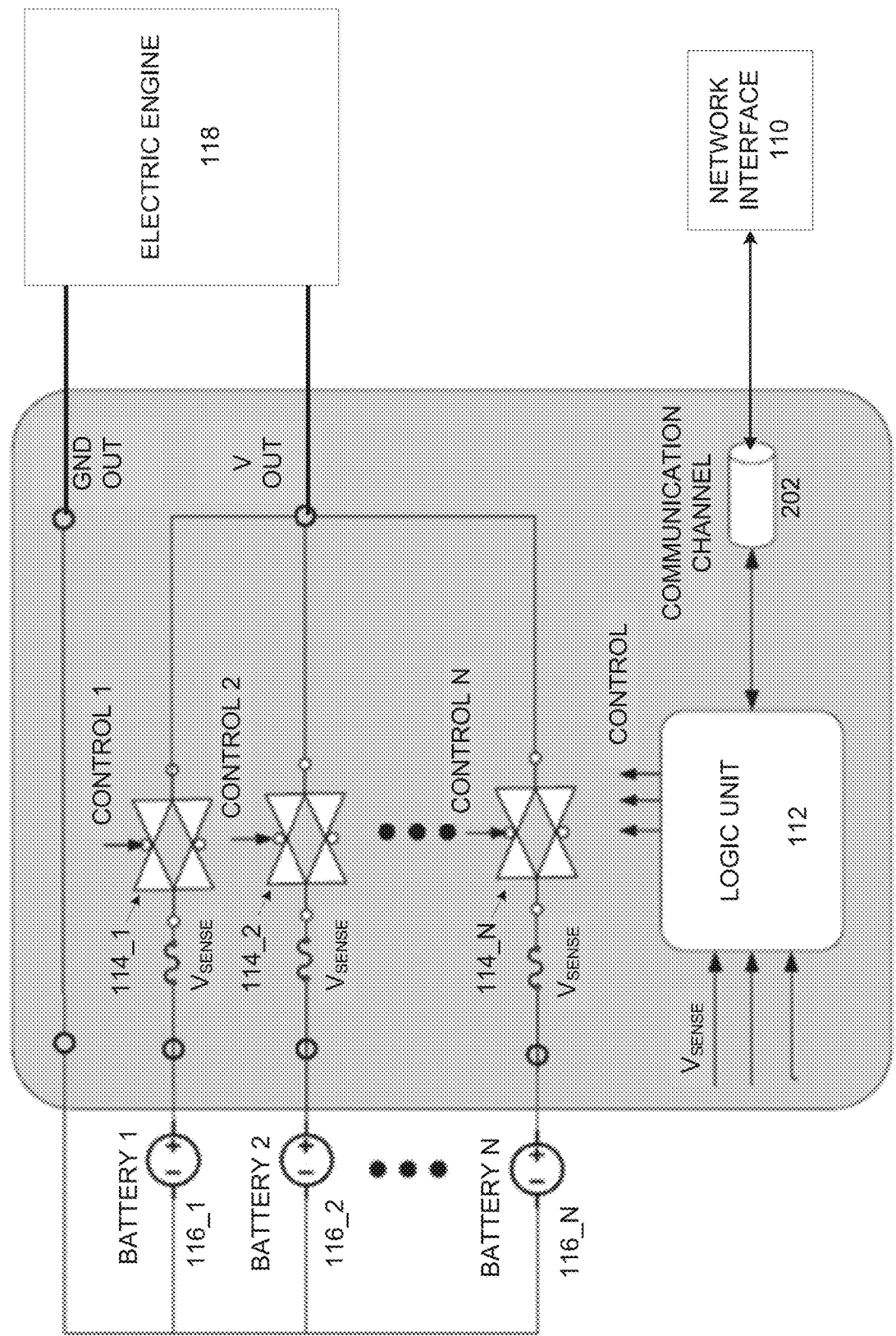
FIG. 2 is a schematic illustration of an exemplary embodiment of a circuitry of a battery controller of an electric vehicle operated to optimize utilization of rechargeable batteries powering the electric vehicle, according to some embodiments of the present invention.

Reference is also made to FIG. 2, which is a schematic illustration of an exemplary embodiment of a circuitry of a battery controller of an electric vehicle operated to optimize utilization of rechargeable batteries powering the electric vehicle, according to some embodiments of the present invention.

As described herein before, the battery controller 112 may operate the switching circuit 114 to control utilization of a plurality of rechargeable batteries 116, for example, a battery 1 116_1, a battery 2 116_2 though a battery N 116_N. For example, the battery controller 112 may comprise control logic configured to control a plurality of switches 114_1, 114_2 through 114_N each configured to couple or decouple a respective one of the rechargeable batteries 116 to each other and/or to the electric engine 118.

The control logic of the battery controller 112 may be further configured to connect to one or more sensing circuits configured to sense (monitor) one or more operational parameters of one or more of the rechargeable batteries 116, for example, a voltage ($V_{SENSE}$), a current ($I_{SENSE}$) and/or the like.

The battery controller 112 may further connect to the network interface 110 via one or more communication channels 202 established over one or more of the wired and/or wireless interfaces, for example, the USB interface, the serial interface, the RF interface, the Bluetooth interface and/or the like. Via the network interface 110, the battery controller 112 may communicate with one or more of the remote battery management systems 130 (not shown).

Figure 3:
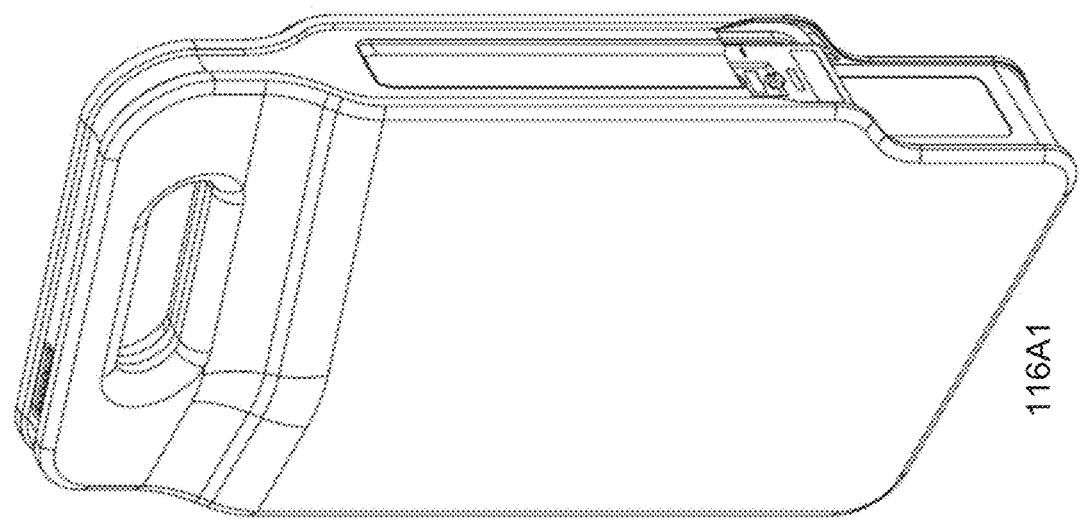
FIG. 3 presents isometric, front, rear, top, bottom and side views of an exemplary replaceable rechargeable batteries used for powering an electric vehicle, according to some embodiments of the present invention.
Figure 3:
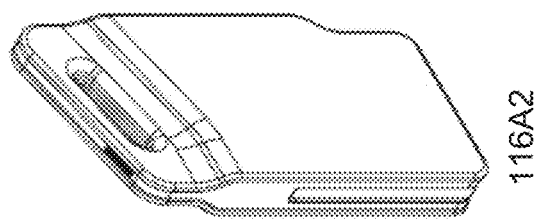
Figure 3:
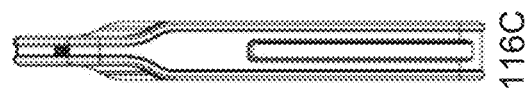
Figure 3:
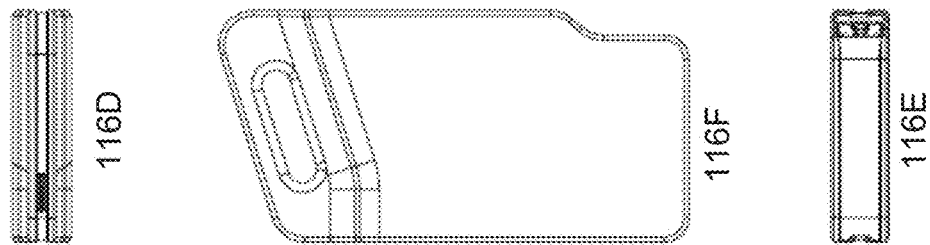
Figure 3:

Reference is now made to FIG. 3, which presents isometric, front, rear, top, bottom and side views of an exemplary replaceable rechargeable batteries used for powering an electric vehicle, according to some embodiments of the present invention. Isometric views 116A1 and 116A2, a front view 116B, a rear view 116C, a top view 116D, a bottom view 116E and a side view 116F provide a comprehensive view of an exemplary rechargeable battery such as the rechargeable battery 116. As described herein before, the rechargeable battery 116 is replaceable and the rechargeable battery 116 may therefore include a handle configured to enable a user to easily installing and/or removing the rechargeable battery 116 in/from an electric vehicle such as the electric vehicle 102, specifically in/from a chassis deployed in the electric vehicle 102 to host the rechargeable battery 116.

Figure 4:
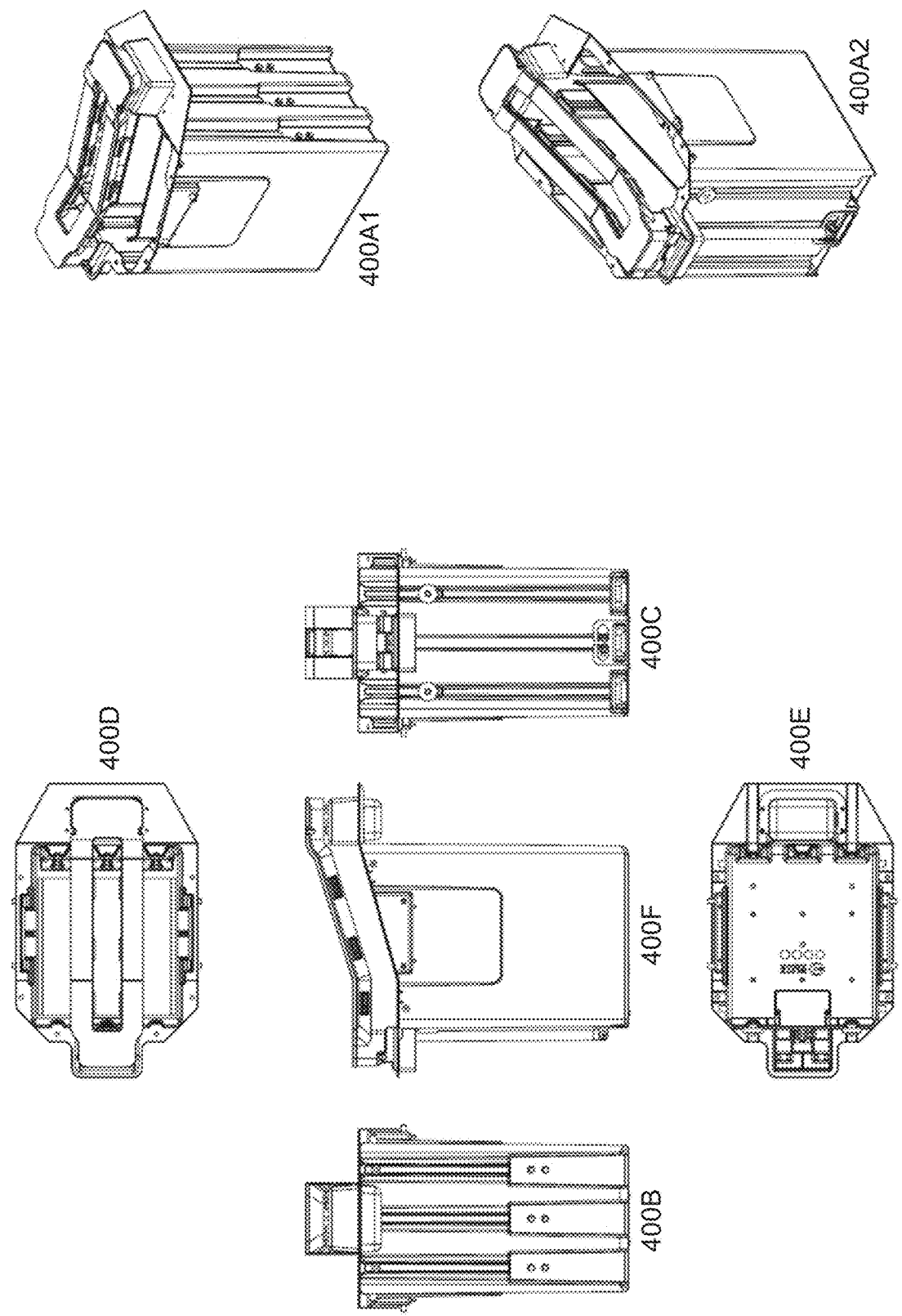
FIG. 4 presents isometric, front, rear, top, bottom and side views of an exemplary chassis configured to host a plurality of replaceable rechargeable batteries installed for powering an electric vehicle, according to some embodiments of the present invention.

Reference is now made to FIG. 4, which presents isometric, front, rear, top, bottom and side views of an exemplary chassis configured to host a plurality of replaceable rechargeable batteries installed for powering an electric vehicle, according to some embodiments of the present invention. Isometric views 400A1 and 400A2, a front view 400B, a rear view 400C, a top view 400D, a bottom view 400E and a side view 400F provide a comprehensive view of an exemplary chassis 400 deployed in an electric vehicle such as the electric vehicle 102 to host one or more replaceable rechargeable batteries such as the rechargeable batteries 116. The chassis 400 may include a plurality of drawers and/or slots, for example, three each configured to host one of the rechargeable batteries 116 installed for powering the electric vehicle 102.

A battery controller such as the battery controller 112 may operate a switching circuit such as the switching circuit 114 for controlling one or more of the rechargeable batteries 116 installed in the chassis 400, specifically according to the battery utilization instructions received from a battery management system such as the battery management system 130. As such, the battery controller 112 may be able to operate the switching circuit 114 to individually control each of the rechargeable batteries 116 installed in the chassis 400, for example, use (discharge) or charge each of the rechargeable batteries 116 installed in the chassis 400. In one exemplary implementation, the chassis 400 may include and/or integrate the battery controller 112 and/or the switching circuit 114. However, in another exemplary implementation, the battery controller 112 and/or the switching circuit 114 may be external to the chassis 400 and the chassis 400 may therefore include one or more connectors for connecting to the switching circuit 114 and/or to the battery controller 112.

Figure 5A:
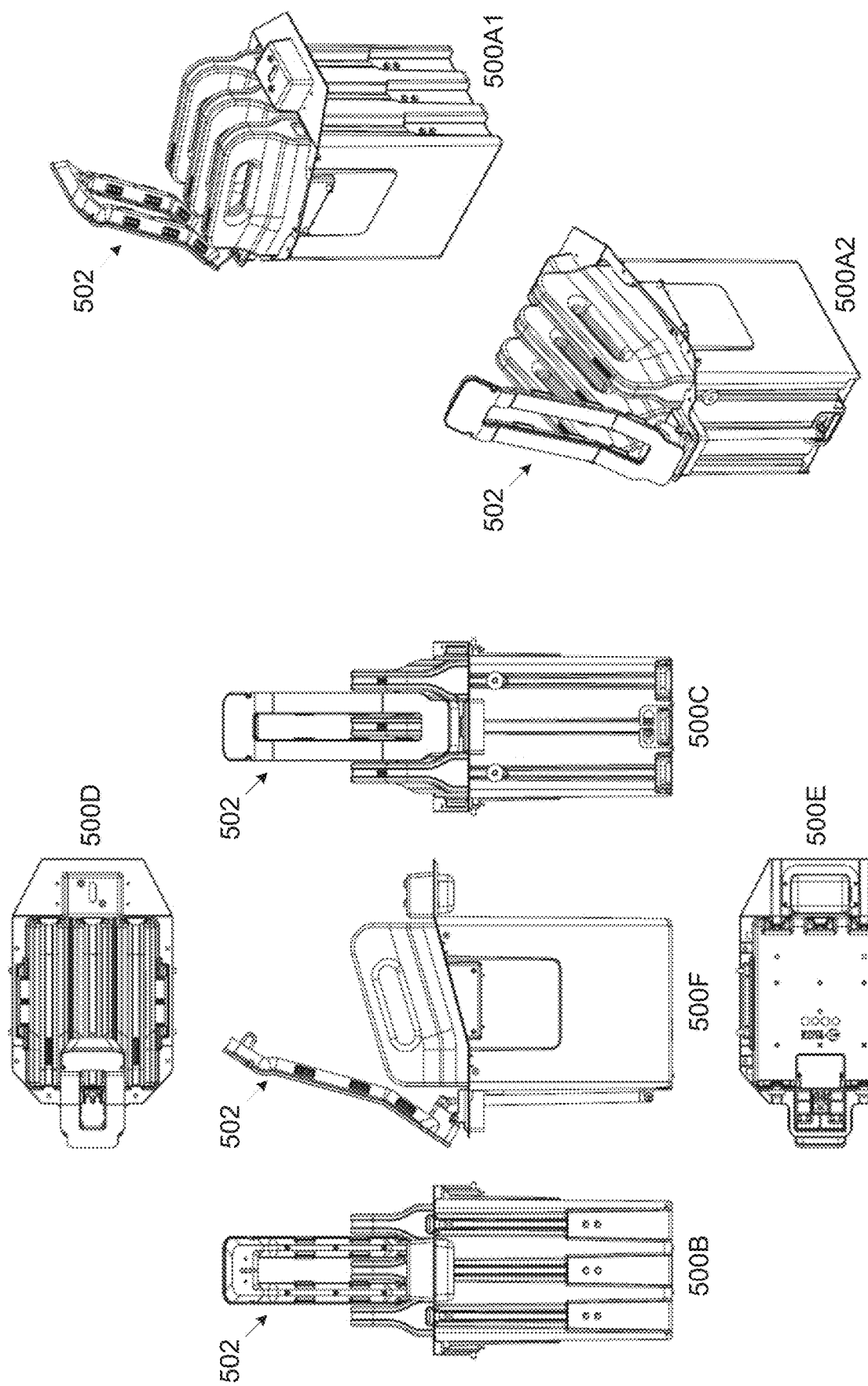
FIG. 5A and FIG. 5B present isometric, front, rear, top, bottom and side views of open and close states of an exemplary chassis hosting a plurality of replaceable rechargeable batteries installed for powering an electric vehicle, according to some embodiments of the present invention.
Figure 5B:
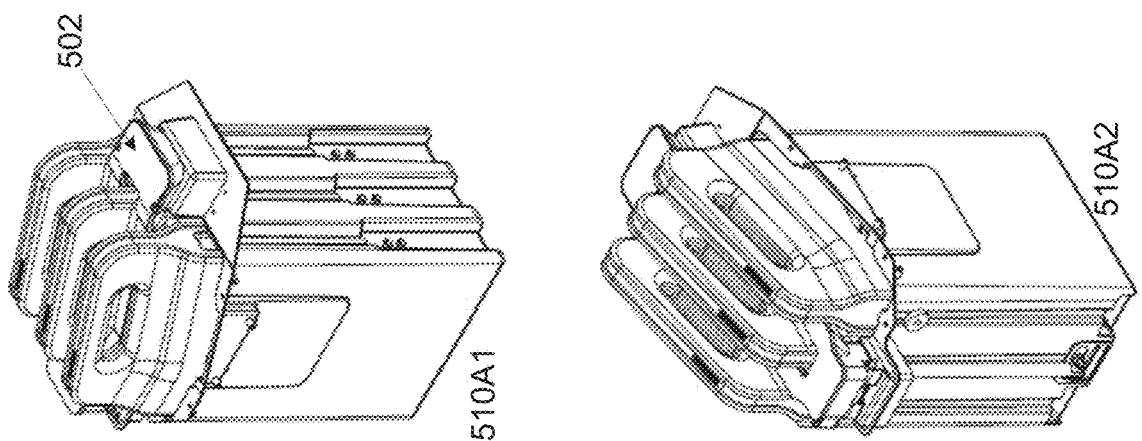
Figure 5B:
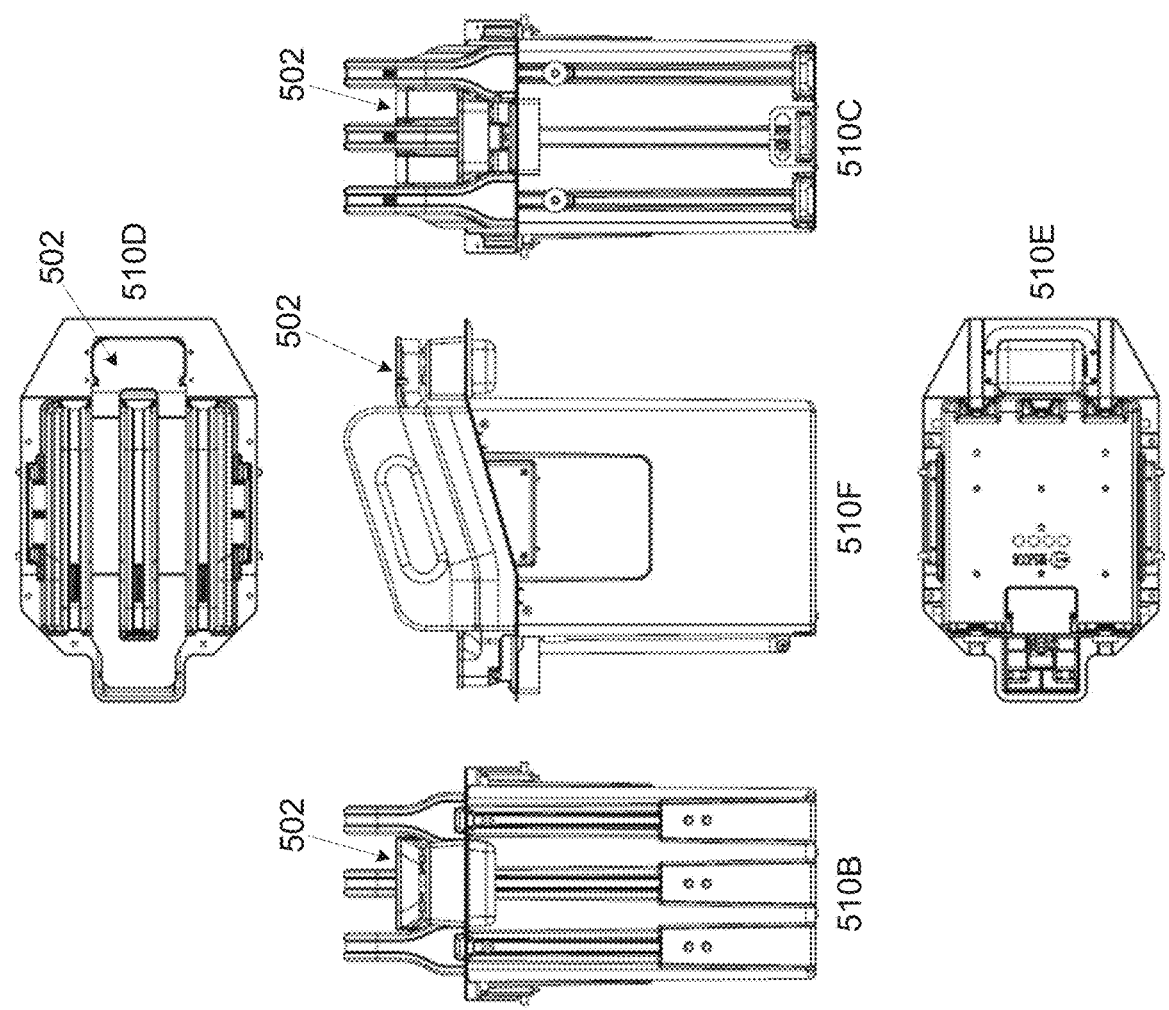

Reference is also made to FIG. 5A and FIG. 5B, which present isometric, front, rear, top, bottom and side views of open and close states of an exemplary chassis hosting a plurality of replaceable rechargeable batteries installed for powering an electric vehicle, according to some embodiments of the present invention. Isometric views 500A1 and 500A2, a front view 500B, a rear view 500C, a top view 500D, a bottom view 500E and a side view 500F provide a comprehensive view of the exemplary chassis 400 hosting three replaceable rechargeable batteries 116, specifically, the chassis 400 in an open state. As seen, a locking lever 502 is in an open state, i.e. lifted to allow insertion and/or removal of one or more of the rechargeable batteries 116 in the chassis 400, specifically in the drawers of the chassis 400. Isometric views 510A1 and 510A2, a front view 510B, a rear view 510C, a top view 510D, a bottom view 510E and a side view 510F provide a comprehensive view of the exemplary chassis 400 in the close state where the locking lever 502 is in a close state, i.e. pushed down and locked to secure the rechargeable batteries 116 in the chassis 400. As seen in at least some of the various views, for example, views 510A1, 510B, 510C, 510D and 510F, the locking level 502 may be configured and shaped to apply some pressure on the rechargeable batteries 116 which are also shaped accordingly to secure the rechargeable batteries 116 in the chassis 400. For example, the rechargeable batteries 116 may include one or more top surface and/or a flange configured to contact one or more surfaces of the locking lever 502 such that when the locking lever 502 is pushed down to its lock (close) state, the locking lever 502 applies pressure on the rechargeable batteries 116 to secure them in place.

Figure 5C:
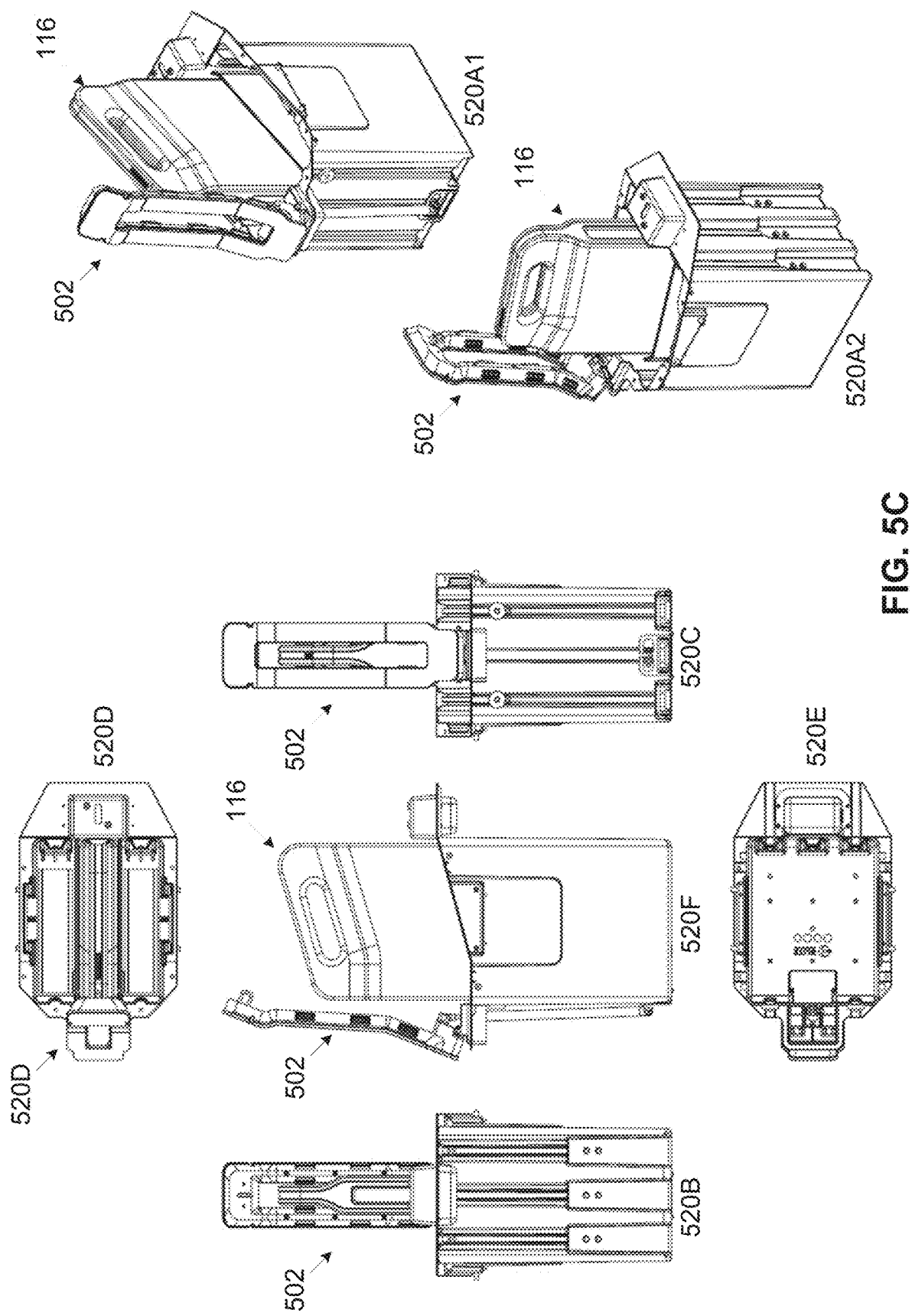
FIG. 5C and FIG. 5D present isometric, front, rear, top, bottom and side views of inserting an exemplary rechargeable battery in an exemplary chassis for powering an electric vehicle, according to some embodiments of the present invention.
Figure 5D:
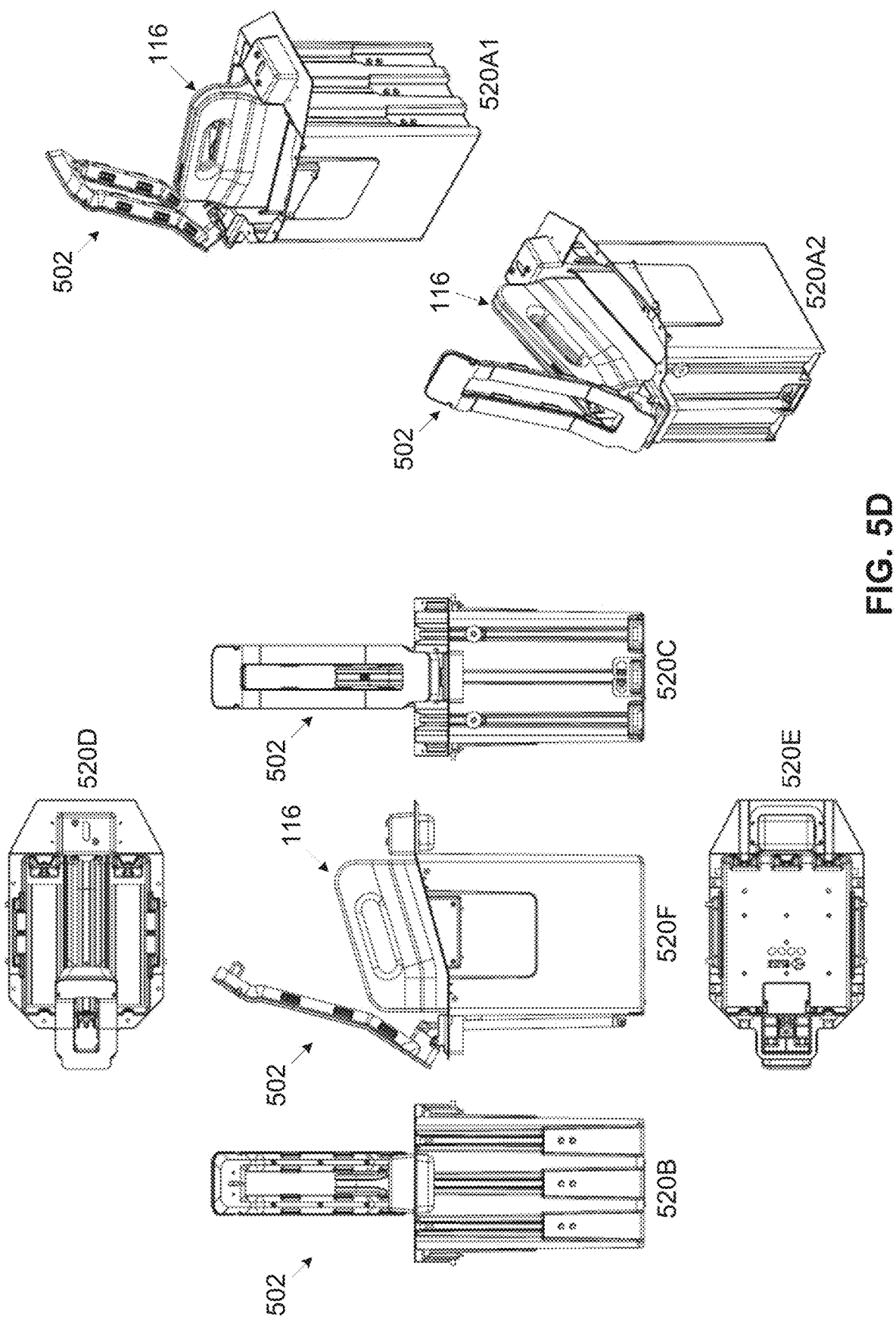

Reference is also made to FIG. 5C and FIG. 5D, which present isometric, front, rear, top, bottom and side views of inserting an exemplary rechargeable battery in an exemplary chassis for powering an electric vehicle, according to some embodiments of the present invention. Isometric views 520A1 and 520A2, a front view 520B, a rear view 520C, a top view 520D, a bottom view 520E and a side view 520F provide a comprehensive view of the exemplary chassis 400 in which a replaceable rechargeable battery 116 is inserted in a center drawer and/or slot of the chassis 400. As seen in at least some of the views, for example, views 520A1, 520A2, and 520F, the locking lever 502 is in the open state, i.e. lifted to allow inserting the rechargeable battery 116 into the center slot of the chassis 400. As seen in isometric views 530A1 and 530A2, a front view 530B, a rear view 530C, a top view 530D, a bottom view 530E and a side view 530F, the rechargeable battery 116 may be easily slid into the drawer and/or slot of the chassis 400.

Figure 6:
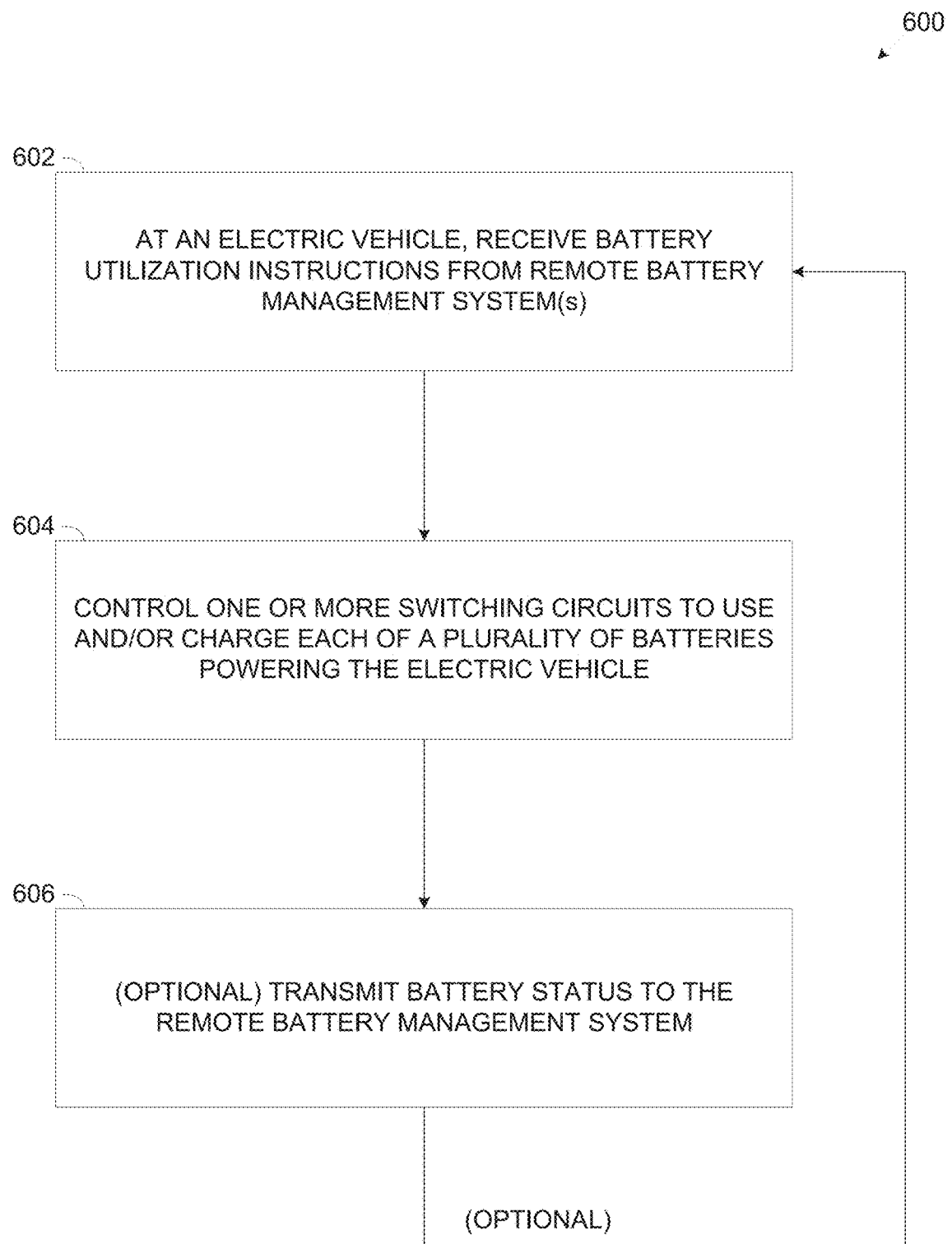
FIG. 6 is a flowchart of an exemplary process of controlling rechargeable batteries powering an electric vehicle to optimize battery utilization, according to some embodiments of the present invention.

Reference is now made to FIG. 6, which is a flowchart of an exemplary process of controlling utilization of rechargeable batteries powering an electric vehicle, according to some embodiments of the present invention. An exemplary process 600 may be executed by a battery controller such as the battery controller 112 deployed in an electric vehicle such as the electric vehicle 102 to control a plurality of rechargeable batteries such as the rechargeable batteries 116 installed in the electric vehicle 102 to power an electric engine such the electric engine 118 of the electric vehicle 102.

In particular, the battery controller 112 may control the plurality of rechargeable batteries 116 according to instructions received form one or more remote battery management systems such as the battery management systems 130 to optimize utilization of one or more of the plurality of rechargeable batteries 116.

As shown at 602, the process 600 starts with the battery controller 112 receiving battery utilization instructions computed by the remote battery management system(s) 130 for using and/or recharging each of one or more of the rechargeable batteries 116 installed in the electric vehicle 102.

As described herein after in detail, the battery management system 130 may compute the battery utilization instructions in attempt to optimize utilization of one or more of the rechargeable batteries 116 installed in the electric vehicle 102, for example, effectively use the energy stored the rechargeable batteries 116, extend battery life by operating the rechargeable batteries 116 according to their nominal operating parameters, and/or the like. To this end, the battery management system 130 may compute the battery utilization instructions based on information available to the battery management system 130, for example, a route of one or more rides planned for the electric vehicle 102, a location of one or more charging sites in which one or more of the rechargeable batteries 116 may be replaced, a current state of one or more of the rechargeable batteries 116 and other information as described in detail herein after.

The battery utilization instructions computed by the battery management system 130 may be thus directed for controlling the operation of each of one or more of the plurality of rechargeable batteries 116, specifically instructions for using the respective rechargeable battery 116 to power the electric engine 118 or instructions for recharging the respective rechargeable battery 116.

For example, the battery utilization instructions may include instructions for using one or more of the rechargeable batteries 116 to power the electric engine 118 of the electric vehicle 102. Moreover, the battery utilization instructions may define using the respective rechargeable battery 116 according to one or more usage rules. The usage rules may include, for example, a rule instructing to use a certain rechargeable battery 116 for powering the electric engine 118 in case the voltage level in the certain rechargeable battery 116 is the highest level among the plurality of rechargeable batteries 116 installed in the electric vehicle 102. In another example, the usage rules may include a rule instructing to use a certain rechargeable battery 116 in case the (current) energy capacity of the certain rechargeable battery 116 is above a certain capacity threshold, for example, 50% of the nominal capacity.

In another example, the battery utilization instructions may include instructions for recharging one or more of the rechargeable batteries 116 while installed in the electric vehicle 102 (in-vehicle recharging). Each of the rechargeable batteries 116 may be recharged from one or more of the other rechargeable batteries 116 installed in the electric vehicle 102 and/or from the engine 118. Moreover, the rechargeable batteries 116 may be recharged from an external power supply which may be connected to the electric vehicle 102 while parked. In particular, the battery utilization instructions may define recharging one or more of the rechargeable batteries 116 according to a one or more charging rules. The charging rules may include, for example, a rule instructing to charge a certain rechargeable battery 116 in case the energy capacity of the certain rechargeable battery 116 is below a certain capacity threshold, for example, 20% of the nominal capacity. In another example, the charging rules may include a rule instructing to charge a certain rechargeable battery 116 from one or more of the other rechargeable batteries 116 having an energy capacity above a certain capacity threshold, for example, 80% of the nominal capacity. In another example, the charging rules may include a rule instructing to charge a certain rechargeable battery 116 from the electric engine 118 whenever the electric vehicle 102 is decelerating and the electric engine 118 may produce energy which may be converted to electric energy for recharging the certain rechargeable battery 116.

As shown at 604, the battery controller 112 may operate (control) the switching circuit 114 to control one or more of the rechargeable batteries 116 according to the battery utilization instructions received from the remote battery management system 130. For example, assuming the battery utilization instructions instruct using a certain rechargeable battery 116, for example, the rechargeable battery 1 116_1 to power the electric engine 118. In such case the battery controller 112 may operate the switch 114_1 to electrically couple the rechargeable battery 1 116_1 to the electric engine 118. In another example, assuming the battery utilization instructions instruct recharging a certain rechargeable battery 116, for example, the rechargeable battery 1 116_1 from another rechargeable battery 116, for example, the rechargeable battery N 116_N and using third rechargeable battery 116, for example, the rechargeable battery 2 116_2 to power the electric engine 118. In such case the battery controller 112 may operate the switches 114_1 and 114_N to electrically couple the rechargeable battery 1 116_1 to the rechargeable battery N 116_N and the switch 114_2 to electrically couple the rechargeable battery 2 116_2 to the electric engine 118.

As shown at 606, which is an optional step, the battery controller 112 may transmit to the remote battery management system 130 battery status information collected for one or more of the rechargeable batteries 116 installed in the electric vehicle 102. The battery status may include values of one or more battery parameters, for example, an energy level of the respective rechargeable battery 116, a voltage level of the rechargeable battery 116, a current level of the respective rechargeable battery 116 and/or the like.

The battery parameters may further include additional information relating to the respective rechargeable battery 116, for example, a usage pattern of the respective rechargeable battery 116, a recharge pattern and/or the like. The usage pattern may comprise one or more usage parameters of the respective rechargeable battery 116, for example, a current drawing rate from the respective rechargeable battery 116, a total time during which the respective rechargeable battery 116 is coupled to power the electric engine 118, a continuous time during which the respective rechargeable battery 116 is continuously coupled to power the electric engine 118 and/or the like. The recharge pattern may comprise one or more charging parameters relating to the respective rechargeable battery 116, for example, a charging current applied to recharge the respective rechargeable battery 116, a total recharge time during which the respective rechargeable battery 116 is recharged, a continuous time during which the respective rechargeable battery 116 is continuously recharged and/or the like.

Moreover, the battery management system 130 may compute additional, new, updated and/or adjusted battery utilization instructions and transmit them to the battery controller 112. The battery management system 130 may compute additional battery utilization instructions according to one or more conditions, specifically changes in the condition(s) as described in detail herein after. For example, the battery management system 130 may update the battery utilization instructions for controlling one or more of the rechargeable batteries 116 based on the battery status information received from the battery controller 112. In another example, the battery management system 130 may adjust the battery utilization instructions for controlling one or more of the rechargeable batteries 116 based one or more changes in the ride(s) planned for the electric vehicle 102.

The battery controller 112 may therefore optionally branch to step 602 to receive the updated and/or adjusted battery utilization instructions from the battery management system 130 and operate the switching 114 to control one or more of the rechargeable batteries 116 accordingly.

Optionally, in case the battery controller 112 does not receive battery utilization instructions from the battery management system 130, for example, due to communication failure, unavailability of the battery management system 130 and/or the like, the battery controller 112 may operate the switching circuit 114 to control the rechargeable batteries 116 according to a default utilization procedure.

According to some embodiments of the present invention, there are provided systems and methods for computing battery utilization instructions for a plurality of rechargeable batteries 116 used to power a fleet of electric vehicles such as the electric vehicle 102 in order to optimize utilization of the plurality of rechargeable batteries 116.

Figure 7:
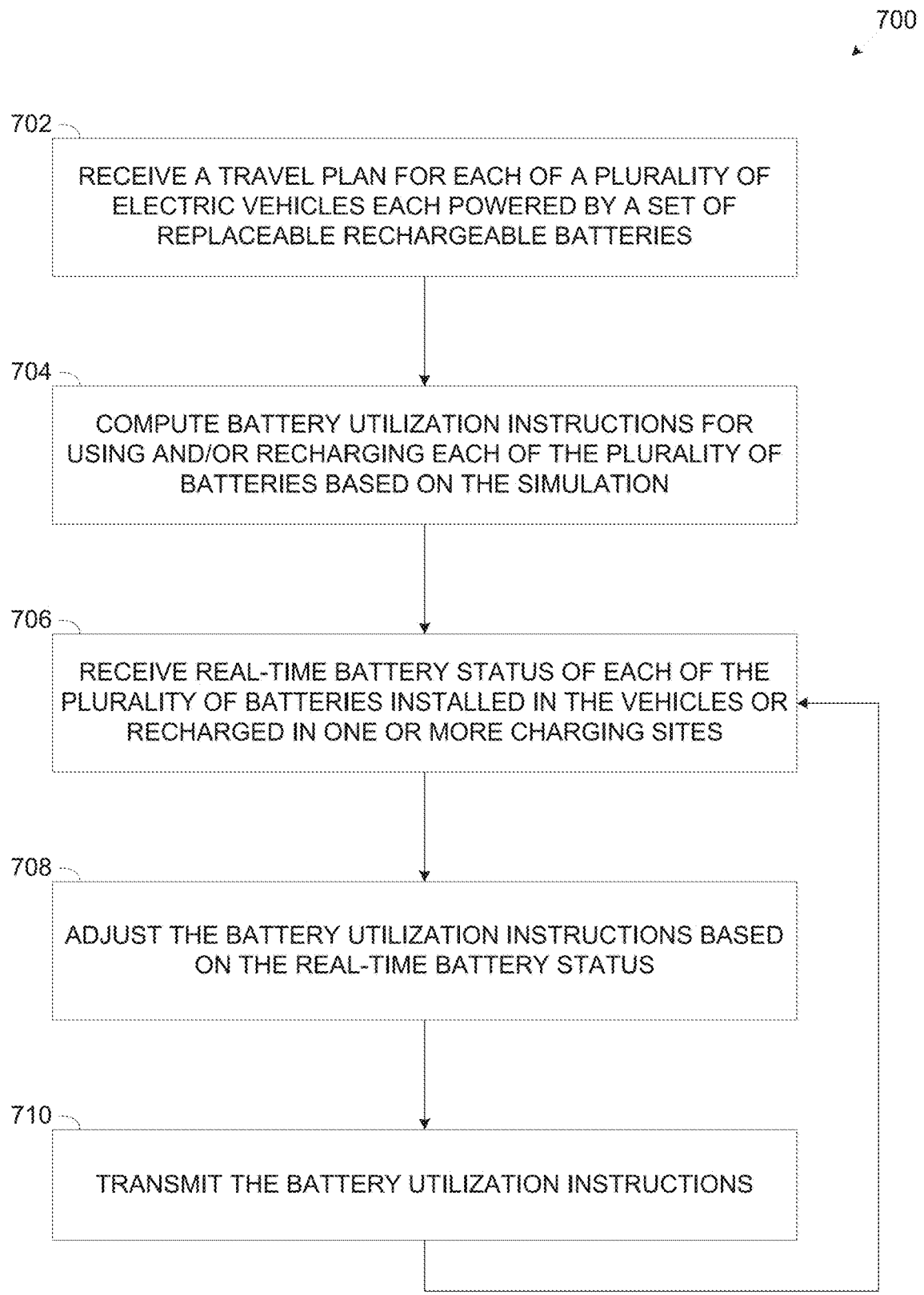
FIG. 7 is a flowchart of an exemplary process of optimizing utilization of rechargeable batteries powering a fleet of electric vehicles, according to some embodiments of the present invention.

Reference is now made to FIG. 7, which is a flowchart of an exemplary process of optimizing utilization of rechargeable batteries powering a fleet of electric vehicles, according to some embodiments of the present invention. An exemplary process 600 may be executed by a battery management system such as the battery management system 130 to optimize battery utilization of a plurality of rechargeable batteries such as the rechargeable batteries 116 used to power a plurality (i.e., a fleet) of electric vehicles such as the electric vehicle 102.

Figure 8:
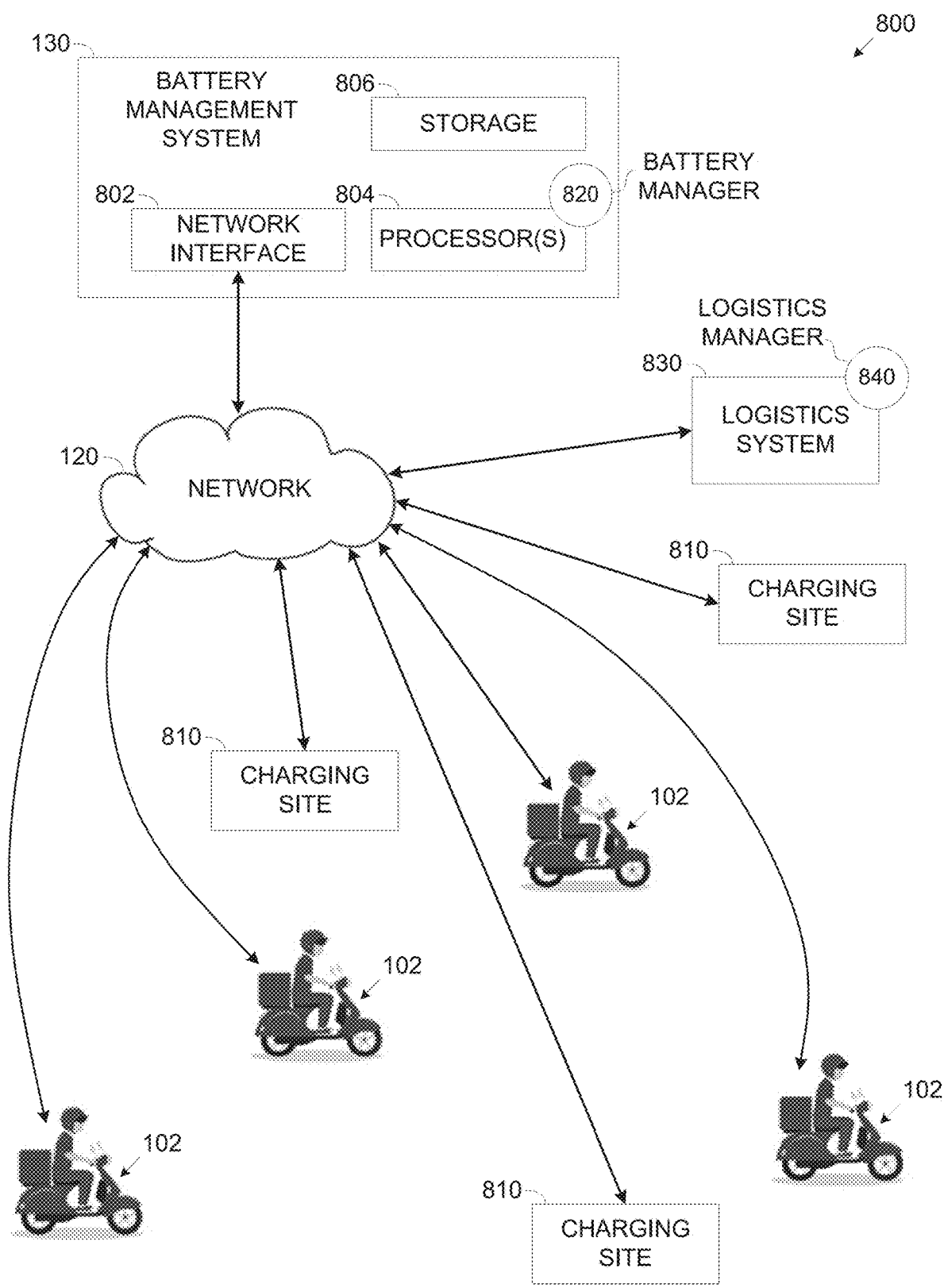
FIG. 8 is a schematic illustration of an exemplary system for optimizing utilization of rechargeable batteries powering a fleet of electric vehicles, according to some embodiments of the present invention.

Reference is also made to FIG. 8, which is a schematic illustration of an exemplary system for optimizing utilization of rechargeable batteries powering a fleet of electric vehicles, according to some embodiments of the present invention. An exemplary environment 800 may include the battery management system 130 configured to execute a process such as the process 700 to optimize battery utilization of the plurality of rechargeable batteries 116 used to power the plurality of electric vehicles 102.

As described herein before the electric vehicles 102 may be ground, aerial and/or naval vehicles which may be used for one or more of a plurality of applications. In one example, the fleet may be used for food delivery and may comprise a plurality of ground electric vehicles 102, for example, electric scooters. In another example, the fleet may be used for a postal delivery service and may comprise a plurality of aerial electric vehicles 102, for example, electric drones. In another example, the fleet may be used for one or more agricultural applications, for example, crops spraying, crop monitoring and/or the like and may comprise a plurality of aerial electric vehicles 102, for example, electric UAVs and/or electric drones.

While it is possible that one or more of the plurality of electric vehicles 102 is installed with only a single rechargeable battery 116, typically each of the electric vehicles 102 is installed with a set comprising multiple rechargeable batteries 116, for example, two, three, four or more rechargeable batteries 116. Each of the electric vehicles 102 may be therefore installed with a battery controller such as the battery controller 112 configured to control the rechargeable batteries 116 installed in the respective electric vehicle 102 as described in the process 600.

Moreover, each of the rechargeable batteries 116 is replaceable as it may be easily pulled out of a respective electric vehicle 102 and optionally replaced with another rechargeable battery 116. Furthermore, each of the plurality of rechargeable batteries 116 may be recharged in one or more of a plurality of charging sites 810 each hosting (comprising) one or more chargers capable of recharging the rechargeable batteries 116.

As such, at any given time, each of the plurality of rechargeable batteries 116 may be installed in one of the plurality of electric vehicles 102 or located in one of the charging sites 810 where it is typically being recharged, waiting to be recharged or held ready for operation after fully recharged. Moreover, at least some and typically all of the rechargeable batteries 116 fit multiple electric vehicles 102 and may be thus installed in at least some of the electric vehicles 102 meaning that these rechargeable batteries 116 may be swapped between electric vehicles 102.

The battery management system 130, for example, a server, a computing node, a cluster of computing nodes, and/or the like may include a network interface 802, a processor(s) 804 and a storage 806 for program code store and/or data store.

The network interface 802 may comprise one or more wired and/or wireless network interfaces, for example, a LAN interface, a WAN interface, a WLAN interface, acellular interface and/or the like for connecting to the network 120. Via the network interface 802, the battery management system 130 may communicate with the plurality of electric vehicles 102, specifically with the battery controller 112 deployed in each electric vehicle 102 to control the operation of each of the set of rechargeable batteries 116 installed in the respective electric vehicle 102. Moreover, via the network interface 802, the battery management system 130 may further communicate with one or more of the charging sites 810, specifically with an operator operating the charger(s) deployed at the respective charging site 810 and/or with one or more charging controllers configured to control each of the charger(s) deployed at the respective charging site 810.

The processor(s) 804, homogenous or heterogeneous, may include one or more processors arranged for parallel processing, as clusters and/or as one or more multi core processor(s). The storage 806 may include one or more non-transitory persistent storage devices, for example, a Read Only Memory (ROM), a Flash array, a hard drive and/or the like. The storage 806 may also include one or more volatile devices, for example, a Random Access Memory (RAM) component, a cache memory and/or the like. The storage 806 may further include one or more network storage resources, for example, a storage server, a network accessible storage (NAS), a network drive, a cloud storage and/or the like accessible via the network interface 802.

The processor(s) 804 may execute one or more software modules such as, for example, a process, a script, an application, an agent, a utility, a tool and/or the like each comprising a plurality of program instructions stored in a non-transitory medium (program store) such as the storage 806 and executed by one or more processors such as the processor(s) 804. The processor(s) 804 may further include, integrate and/or utilize one or more hardware modules (elements) integrated and/or utilized in the battery management system 130, for example, a circuit, a component, an IC, an ASIC, an FPGA, a DSP and/or the like.

The processor(s) 804 may therefore execute one or more functional modules, for example, a battery manager 820 for executing the process 700 executed using one or more software modules, one or more of the hardware modules and/or a combination thereof.

Optionally, the battery management system 130, specifically the battery manager 820 may be implemented as one or more cloud computing services and/or platforms, for example, an Infrastructure as a Service (IaaS), a Platform as a Service (PaaS), a Software as a Service (SaaS) and/or the like deployed over one or more cloud computing platforms such as, for example, Amazon Web Service (AWS), Google Cloud, Microsoft Azure and/or the like.

Via the network interface 802, the battery management system 130, specifically the battery manager 820 may also communicate with one or more remote systems connected to the network 120. For example, the battery manager 820 may communicate with one or more logistics systems 830 used for operating the fleet of electric vehicle 102.

The logistics system 830, for example, a server, a computing node, a cluster of computing nodes, a cloud service, a cloud platform and/or the like may further communicate with the electric vehicles 102 as well as with one or more other networked resources, services, platforms and/or systems. The logistics system 830 may execute a logistics manager 840 utilizing one or more software modules, one or more hardware modules available to the logistics system and/or a combination thereof. The logistics manager 840 may be executed to generate energy consumption requirements for each of the electric vehicles 102 of the fleet. The logistics manager 840 may further adjust and/or update the energy consumption requirements for one or more of the electric vehicles 102 based on one or more conditions, specifically real-time conditions detected while the electric vehicles 102 are operated according to the travel plan.

As stated herein before, each of the electric vehicles 102 may be installed with multiple rechargeable batteries 116 controlled by the battery controller 112 deployed in the respective electric vehicle 102. A battery load capability, i.e. the number of rechargeable batteries 116 that may be installed each electric vehicle 102 and possible combinations of installed rechargeable batteries 116 are predefined and known to the battery manager 820.

Each of the charging sites 810 may be manually operated by one or more maintenance persons (operators) operating the respective charging site 810, specifically capable to remove and install a rechargeable battery 116 in an electric vehicle 102 as well as setup the rechargeable battery 116 for charging by an available charger deployed in the respective charging site 810. Optionally, one or more of the chargers deployed in one or more of the charging sites 810 may be controlled by one or more charging controllers configured to control one or more charging parameters of one or more of the charger(s) deployed in the respective charging site 810, for example, a charging rate, a charging period, a charging start time, a charging end time and/or the like. Moreover, one or more of the charging controllers may be configured to control one or more automated systems, for example, a robotic arm capable of removing and installing a rechargeable battery 116 in an electric vehicle 102 and further setting up the rechargeable battery 116 for charging by an available charger deployed in the respective charging site 810.

Moreover, as described herein before, one or more of the rechargeable batteries 116 may be recharged while installed in a respective electric vehicle 102, for example, from another rechargeable battery 116 installed in the same respective electric vehicle 102 and/or from the electric engine 118 of the respective electric vehicle 102. Moreover, one or more of the rechargeable batteries 116 installed in one or more of the electric vehicles 102 may be recharged from an external power supply which may be connected to the respective electric vehicle 102 while parked.

As shown at 702, the process 700 starts with the battery manager 820 receiving a travel plan (work assignment) describing a travel plan for each of the plurality of electric vehicles 102 of the fleet.

The travel plan may define at least some trip parameters of each trip planned and assigned for the respective electric vehicle 102 for a certain future time period, for example, a day, a week, a month and/or the like in a certain geographical area. The travel plan may essentially include some basic trip parameters of each trip planned for each electric vehicle 102 during the certain future time period, for example, a route (expressing path and distance) of the respective trip, a scheduled time of the respective trip, a distance of the respective trip and/or the like.

However, the travel plan may further include one or more additional trip parameters applicable for one or more of the trips planned for one or more of the electric vehicles 102, for example, a driver of the respective electric vehicle 102 assigned for the respective trip, a weight of cargo estimated to be loaded on the respective electric vehicle 102 in the respective trip, one or more stops planned along the route of the respective trip, operational parameters of the respective electric vehicle 102, specifically an energy consumption of the respective electric vehicle 102 and/or the like.

The travel plan may specify the number of electric vehicle 102 available to conduct the trips defined by the travel plan as well as the battery capacity of each of the electric vehicles 102, for example, how many rechargeable batteries 116 may be simultaneously installed in each electric vehicle 102, energy consumption ratings of each electric vehicle 102, in-vehicle recharging capabilities of each electric vehicle 102 and/or the like. The travel plan may also describe one or more attributes and/or parameters relating to the rechargeable batteries 116 available to power the electric vehicles 102, for example, a number of the rechargeable batteries 116, an energy capacity of each of the rechargeable batteries 116 and/or the like.

The travel plan further describes one or more attributes and/or parameters of the infrastructure available to support the fleet, specifically parameters relating to each charging site 810, for example, a location of the respective charging site 810, a number of chargers deployed in the respective charging site 810, a charging capacity of each charger and/or the like.

Moreover, the travel plan may correlate between the trips and the charging sites 810, specifically the travel plan may indicate that each of the trips may start in one of the charging sites 810 and may end in one of the charging site 810 which may be the same charging site 810 from which the trip started or it may be a different charging site 810.

For example, assuming the fleet comprises a plurality of food delivery electric scooters such as the electric vehicles 102 each powered by a set of rechargeable batteries 116 which are used by a food company to deliver food from three restaurants. The three restaurants are located in predefined and known locations within a certain geographical area which is sufficiently limited to allow the electric scooters to travel between the restaurants. Moreover, each of the restaurants may serve as a charging site 810 and is thus deployed with a predefined and known number of chargers suitable for charging the rechargeable batteries 116 used by the electric scooters. In such case, the travel plan which may be defined for a certain future time period, for example, a coming day, may state the predefined and known parameters relating to the fleet, for example, the overall number of electric scooters available for the coming day, the overall number of rechargeable batteries 116 available for use during the coming day, the location of the restaurants serving as the charging sites 810 available for the day and the number of available chargers in each of the restaurants. The travel plan may further include trip parameters of each trip scheduled for each of the electric scooters for the coming day. The travel plan may comprise at least the basic trip parameters of each trip, specifically, the route (expressing path and distance) and the time scheduled for each trip. However, the travel plan may further include one or more additional trip parameters for one or more of the trips, for example, an identity (ID) of a driver assigned to drive the respective electric scoter in the respective trip, a weight of cargo estimated to be loaded on the respective electric scooter during the respective trip, one or more stops planned along the route of the respective trip and/or the like.

In another example, assuming the fleet comprises a plurality of item delivery electric drones such as the electric vehicles 102 each powered by a set of rechargeable batteries 116 which are used by a delivery company to deliver items from five distribution centers. The five distribution centers are located in predefined and known locations within a certain geographical area which is sufficiently limited to allow the electric drones to travel between at least some of the distribution centers. Moreover, each of the distribution centers may serve as a charging site 810 and is thus deployed with a predefined and known number of chargers suitable for charging the rechargeable batteries 116 used by the electric drones. In such case, the travel plan which may be defined for a certain future time period, for example, a coming week may first state the predefined and known parameters relating to the fleet, for example, the overall number of electric drones available for the coming week, the overall number of rechargeable batteries 116 available for use during the coming week, the location of the distribution centers serving as the charging sites 810 available for the week and/or part thereof and the number of available chargers in each of the distribution centers. The travel plan may further include trip parameters of each trip scheduled for each of the electric drones for the coming week. Again, the travel plan may comprise at least the basic trip parameters of each trip, specifically, the route and the time scheduled for each trip. As described for the previous example, the travel plan may further include one or more of the additional trip parameters for one or more of the trips, for example, the cargo weight estimated to be loaded on the respective electric drone during the respective trip, one or more stops planned for the respective electric drone along the route of the respective trip and/or the like.

In another example, assuming the fleet comprises a plurality of crop pickup electric drones such as the electric vehicles 102 each powered by a set of rechargeable batteries 116 which are used by an agriculture related company to pick up crop products, for example, fruits from trees in an orchard. Further assuming two crop product drop pointes are located in the orchard where the crop pickup electric drones may drop the fruit they picked from trees in the orchard. Each of the drop points may further serve as a charging site 810 and may thus host a known number of chargers for charging one or more of the rechargeable batteries 116 used to power the crop pickup electric drones. In such case, the travel plan which may be defined for a certain future time period, for example, next five days which are fruit pickup (harvesting) season. The travel plan may first state the predefined and known parameters relating to the fleet, for example, the overall number of electric scooters available for the pickup season, the overall number of rechargeable batteries 116 available for use during the pickup season and the number of available chargers in each of the charging sites 810. The travel plan may further include trip parameters of each trip scheduled for each of the electric drones for the pickup season, i.e., the trips to the trees and from the tress to the drop points. Again, the travel plan may comprise at least the basic trip parameters of each trip, specifically, the route and the time scheduled for each trip. As described for the previous examples, the travel plan may further include one or more of the additional trip parameters for one or more of the trips, for example, the cargo weight estimated to be loaded on the respective crop pickup electric drone during the respective trip, one or more stops planned for the respective crop pickup electric drone along the route of the respective trip and/or the like.

As shown at 704, the battery manager 820 may compute battery utilization instructions for controlling, i.e., using and/or recharging each of the plurality of rechargeable batteries 116 based on the received travel plan.

For example, the battery manager 820 may simulate one or more usage scenarios identified for the plurality of rechargeable batteries 116 available to power the electric vehicles 102 assigned for the plurality of trips defined by the travel plan. The battery manager 820 may integrate and/or utilize one or more simulators for simulating battery utilization of each of the plurality of rechargeable batteries 116 in terms of energy drawn from the respective rechargeable battery 116. The battery manager 820 may simulate the battery utilization of each rechargeable battery 116 based on expected usage of the respective rechargeable battery 116 during the certain future time period defined by the travel plan.

To this end, the battery manager 820 may first analyze the travel plan to extract availability of resources, specifically, availability of the electric vehicles 102, availability of the rechargeable batteries 116, availability of the chargers and their distribution in the charging sites 810. As such, battery manager 820 may extract from the travel plan, the (number of) the plurality of electric vehicles 102 available to conduct the plurality of trips specified in the travel plan. The battery manager 820 may further extract from the travel plan a battery capacity of each of the electric vehicles 102, for example, a number of rechargeable batteries 116 installable in the respective vehicle 102 at the same time, a recharging capability for rechargeable batteries 116 installed in the respective vehicle 102 and/or the like. The battery manager 820 may also extract from the travel plan the (number and/or type of) the rechargeable batteries 116 available to power the electric vehicles 102 operated to conduct the trips. In addition, the battery manager 820 may extract from the travel plan the location of the charging site(s) 810 available to charge the rechargeable batteries 116, the number of chargers available in each charging site, a charging capacity of each charger, for example, a charging rate, a charging time, a charging current, a charging voltage and/or the like.

The battery manager 820 may then analyze the routes and schedules of the plurality of trips and based on the available resources, the battery manager 820 may identify one or more possible resources allocation configurations for allocating the plurality of electric vehicles 102 to conduct the plurality of trips and allocating the rechargeable batteries 116 to power the electric vehicles 102 accordingly. Each such resources allocation configuration may define the allocation of the resources to successfully conduct the trips defined by the travel plan, for example, the electric vehicle 102 allocated (assigned) to conduct each trip, the rechargeable batteries 116 installed in each electric vehicle 102, a location and schedule for recharging one or more of the rechargeable batteries 116, a location and optionally a time for swapping one or more rechargeable batteries 116 between electric vehicle 102 and/or the like, a time for transferring one or more rechargeable batteries 116 from one recharging site 810 to another and/or the like.

The battery manager 820 may analyze one or more of the resources allocation configurations to derive, for example, identify, compute, emulate and/or the like one or more of the usage scenarios each defining the use and recharging of each of the plurality of rechargeable batteries 116 according to the respective resources allocation configuration. Each usage scenario may include one or more usage periods where in each usage period the respective rechargeable battery 116 is used to power one of the electric vehicles 102. Each usage scenario may also include one or more charging periods where in each charging period the respective rechargeable battery 116 is recharged either while installed in one of the electric vehicles 102 or by one of the chargers deployed in one of the charging sites 810.

The battery manager 820 may then derive a plurality of usage scenarios from the resources allocation configurations, where each usage scenario reflects the way each of the rechargeable batteries 116 is used and/or recharged during the future time period defined by the travel plan. The battery manager 820 may simulate one or more of the usage scenarios to estimate an energy consumption and a battery degradation of each of the plurality of rechargeable batteries 116 when used according to the simulated usage scenario. Specifically, the battery manager 820 may simulate the operational parameters applied to (experienced by) each of the rechargeable batteries 116 according to the respective usage scenario, for example, energy consumption, overall usage time, continuous usage time, levels of drawn current, recharge time, recharge current, recharge voltage, operation within the nominal operational parameters or exceeding them and/or the like. By simulating the operational parameters under which each rechargeable battery 116 is expected to operate, the battery manager 820 may estimate the battery degradation of each of the plurality of rechargeable batteries 116.

The battery manager 820 may further translate the battery degradation of each of the plurality of rechargeable batteries 116 to cost values according to one or more cost vs. use metrics applied to compute an expected maintenance cost for each of the rechargeable batteries 116 used according to each simulated usage scenario. For example, the battery manager 820 may compute the cost of the energy drawn from each of the rechargeable batteries 116 to power the electric vehicles 102 based on one or more cost parameters. The cost parameters may include, for example, the cost of electricity drawn by the chargers from the electric grid to recharge the rechargeable batteries 116, the cost of operating the chargers, the cost for installing and removing the rechargeable batteries 116 in and out of the electric vehicles and/or the like. The cost parameters may further include the life expectancy of one or more of the rechargeable batteries 116 which may be translated to cost per use. Moreover, the battery manager 820 may compute the cost for using the rechargeable batteries 116 according to the simulated usage scenarios based on one or more objective functions which may be optionally defined by an operator of the fleet of electrical vehicles 102.

The battery manager 820 may employ, integrate and/or utilize one or more optimization algorithms, functions, tools and/or the like for evaluating the usage scenarios simulated for the plurality of rechargeable batteries 116 and identifying an optimal usage scenario such that a total battery utilization of the plurality of rechargeable batteries 116 is maximal. The optimal battery utilization of one or more of the rechargeable batteries 116 may be expressed by extending battery longevity which may be accomplished, for example, by operating the rechargeable batteries 116 according to their nominal operational parameters such as the maximum and/or minimum voltage and/or current levels and/or the like and not exceeding them. In another example, the battery longevity of a respective rechargeable battery 116 may be extended by reducing the number of recharge cycles of the respective rechargeable battery 116. The optimal battery utilization of one or more of the rechargeable batteries 116 may be also expressed by the cost per energy computed based on the maintenance cost of one or more of the rechargeable batteries 116.

For example, the battery manager 820 may select the optimal usage scenario in which the best battery utilization in terms of battery longevity (life span) is estimated for at least a majority of the rechargeable batteries 116 which are operated within their nominal operational parameters. In another example, the battery manager 820 may select the optimal usage scenario in which the overall energy cost is the lowest. In another example, the battery manager 820 may select the optimal usage scenario which is a tradeoff between the battery longevity and the energy cost. The battery manager 820 may select the optimal usage scenario according to one or more objective functions, for example, a cost objective function, a battery preservation function, a combination thereof and/or the like. Moreover, the battery manager 820 may apply one or more multi-objective optimization algorithms, functions, tools and/or the like to identify and select the optimal usage scenario based on multiple objective functions each directed to optimize a certain one of the battery utilization aspects, for example, the energy cost, the longevity and/or the like.

The battery manager 820 may optionally further optimize one or more of the usage scenarios to increase the battery utilization of the rechargeable batteries 116 used according to the respective usage scenario. However, when optimizing one or more of the usage scenarios, the battery manager 820 may alter one or more of the usage scenarios while ensuring that the altered usage plan fully complies with the travel plan such that the trips defined by the travel plan may be conducted as planned.

It should be noted that it is possible that some of the rechargeable batteries 116 used according to the selected and optionally optimized optimal usage scenario are not used optimally, for example, operated to exceed their nominal operational parameters, recharged in multiple recharge cycles which may degrade their longevity, and/or operated such that they inflict high maintenance cost. However, the overall battery utilization of the plurality of rechargeable batteries 116 used according to the optimal usage scenario may be optimal among the plurality of usage scenarios.

After simulating and optionally optimizing the selected usage scenario, the battery manager 820 may compute the battery utilization instructions accordingly for controlling, i.e., using and/or recharging each of the plurality of rechargeable batteries 116 used according to the selected usage scenario.

In particular, the battery manager 820 may compute the battery utilization instructions to utilize the resources allocation configuration corresponding to the optimal usage scenario selected by the battery manager 820. The battery utilization instructions computed by the battery manager 820 are thus directed to control the operation of each of one or more of the plurality of rechargeable batteries 116 to optimize the overall battery utilization of the rechargeable batteries 116.

For example, the battery utilization instructions may indicate, for one or more of the rechargeable batteries 116, installing the respective rechargeable battery 116 in a certain one of the electric vehicles 102 optionally at a certain time. In another example, the battery utilization instructions may indicate, for one or more of the rechargeable batteries 116, removing the respective rechargeable battery 116 from a certain one of the electric vehicles 102 optionally at a certain time. In another example, the battery utilization instructions may indicate, for one or more of the rechargeable batteries 116, using the respective rechargeable battery 116 to power a respective electric vehicle 102 according to a respective usage pattern defining one or more of the usage parameters. In another example, the battery utilization instructions may indicate, for one or more of the rechargeable batteries 116, using the respective rechargeable battery 116 to power a respective electric vehicle 102 according to one or more of the usage rules.

In another example, the battery utilization instructions may indicate, for one or more of the rechargeable batteries 116, recharging the respective rechargeable battery 116 using a respective charger deployed in a respective charging site 810 optionally at a certain time and for a certain charging period. In another example, the battery utilization instructions may indicate, for one or more of the rechargeable batteries 116, recharging the respective rechargeable battery 116 while installed in a certain electric vehicle 102 from one or more other rechargeable batteries 116 installed in the same electric vehicle(s) 102 optionally at a certain time and for a certain charging period. In another example, the battery utilization instructions may indicate, for one or more of the rechargeable batteries 116, recharging the respective rechargeable battery 116 while installed in a certain electric vehicle 102 from the engine 118 of the certain electric vehicle 102. In another example, the battery utilization instructions may indicate, for one or more of the rechargeable batteries 116, recharging the respective rechargeable battery 116 according to a respective recharge pattern defining one or more of the charging parameters. In another example, the battery utilization instructions may indicate, for one or more of the rechargeable batteries 116, recharging the respective rechargeable battery 116 according to one or more of the charging rules.

In another example, the battery utilization instructions may instruct transferring one or more of the rechargeable batteries 116 between two or more of the charging sites 810 optionally at certain time(s) to make the transferred rechargeable batteries 116 available for installation in one or more of the electric vehicles 102 planned to be at the respective charging site 810 at certain time(s). The battery utilization instructions may further instruct that one or more of the rechargeable batteries 116 are transferred between two or more of the charging sites 810 by one or more of the electric vehicles 102.

Optionally, the battery manager 820 adjusts the battery utilization instructions computed for controlling one or more of the rechargeable batteries 116 according to a one or more parameters relating to one or more aspects which may affect the battery utilization of one or more of the rechargeable batteries 116. However, in case of adjusting the battery utilization instructions, the battery manager 820 may further ensure that the resources allocation configuration corresponding to the optimal usage scenario selected by the battery manager 820 may be maintained to successfully carry out the received travel plan.

In particular, the battery management system 130 may adjust the battery utilization instructions according to adjusted energy consumption requirements received from the logistics manager 840 for one or more of the electric vehicles 102.

For example, the battery manager 820 may adjust the battery utilization instructions computed for controlling one or more of the rechargeable batteries 116 according to energy consumption requirements generated by the logistics manager 840 based on a driving pattern (behavior) of one or more drivers assigned to drive and/or operate one or more of the electric vehicles 102 in one or more of the trips while powered by the respective rechargeable battery 116.

The logistics manager 840 may learn the driving pattern of one or more of the drivers by analyzing driving information collected over time for a plurality of trips conducted by the respective driver. The driving information, for example, speed, acceleration events, deceleration events, breaking events and/or the like may be collected, for example, by one or more sensors installed and/or mounted in one or more electric vehicles 102 while driven by the respective driver. In another example, the driving information may be extracted from geolocation data collected by one or more tracking systems, for example, a fleet monitoring system, a Global Positioning System (GPS), a cellular tracking system and/or the like which may track one or more drivers while driving one or more of the electric vehicles 102.

The logistics manager 840 may further use one or more Machine Learning (ML) models for example, a neural network, a Support Vector Machine (SVM) and/or the like to learn the driver patterns of one or more of the drivers. The ML model(s) which may be trained with the driving information collected for one or more of the drivers may further evolve and adjust according to additional driving information collected for the respective driver(s) over time.

The logistics manager 840 may then adjust the energy consumption requirements accordingly. Specifically, the logistics manager 840 may then adjust the energy consumption requirements for one or more of the electric vehicles assigned to one or more trips according to the driving pattern of one or more drivers assigned to this trip(s). For example, assuming that a certain driver assigned for one or more of the trips is associated a driving pattern which is characterized by high energy consuming driving, for example, rapid and frequent acceleration, high speed and/or the like. In such case, the logistics manager 840 may estimate that, due to the high energy consuming driving pattern of the certain driver(s), more energy will be required for powering the electric vehicle(s) 102 driven by the certain driver(s). The logistics manager 840 may then transmit the adjusted energy consumption requirements to the battery manager 820. In response, the battery manager 820 may adjust the battery utilization instructions for rechargeable batteries 116 allocated to power the respective electric vehicle(s) assigned to one or more trips according to the driving pattern of one or more drivers assigned to this trip(s). Specifically, the battery manager 820 may estimate that, due to the increased energy consuming requirements, more energy will be drawn from one or more rechargeable batteries 116 powering the respective electric vehicle(s) 102 driven by the certain driver(s) which may faster drain the respective rechargeable battery(s) 116. The battery manager 820 may therefore adjust the battery utilization instructions for the respective rechargeable battery(s) 116 accordingly.

In another example, the battery manager 820 may adjust the battery utilization instructions computed for controlling one or more of the rechargeable batteries 116 according to availability information indicative of availability of the maintenance persons (operators) operating each of the charging sites 810. The availability information may include, for example, a number of available maintenance persons at each charging site 810 at each time during the future time period and/or the like. The availability information may be included in the travel plan such that the battery manager 820 may extract it and use it accordingly. However, the battery manager 820 may optionally communicate with one or more of the charging sites 810 to receive the availability information for the maintenance person(s) operating the respective charging site(s) 810.

The battery manager 820 may then adjust the battery utilization instructions according to the availability of maintenance persons such that the battery utilization instructions which may specify a location and time for installing, removing and/or recharging one or more of the rechargeable batteries 116 may be carried out by one or more maintenance persons available at the specified location and time. For example, assuming that the battery utilization instructions initially instruct installing a certain rechargeable battery 116 in a certain vehicle 102 at a certain charging site 810 and at a certain time. Further assuming that the battery manager 820 determines that no maintenance person is available at the certain charging site 810 and at a certain time to install the certain rechargeable battery 116. In such case, the battery manager 820 may adjust the battery utilization instructions to instruct using the certain rechargeable battery 116 according to a different usage pattern to reduce the energy consumed from it, instruct recharging the certain rechargeable battery 116 while installed in one of the electric vehicles 102 and/or the like.

In another example, the battery manager 820 may adjust the battery utilization instructions computed for controlling one or more of the rechargeable batteries 116 according to one or more energy consumption parameters of the power source available in one or more of the charging sites 810. The energy consumption parameters may include, for example, a tariff of electricity drawn from the power grid in a respective charging site 810 at each time during the future time period, a load on the power grid in a respective charging site 810 at each time during the future time period, potential power drops and/or surges mapped in time during the future time period and/or the like. One or more of the energy consumption parameters may be included in the travel plan such that the battery manager 820 may extract them and use them accordingly. However, the battery manager 820 may optionally communicate with one or more of the charging sites 810 to receive one or more of the energy consumption parameters applicable for the respective charging site(s) 810.

The battery manager 820 may then adjust the battery utilization instructions according to the energy consumption parameters. For example, assuming that the battery utilization instructions initially instruct recharging a certain rechargeable battery 116 at a certain charging site 810 at a certain time in which the electricity tariff is significantly high. In such case, the battery manager 820 may adjust the battery utilization instructions to instruct recharging the certain rechargeable battery 116 at a different time during which the electricity tariff is significantly lower.

In another example, the battery manager 820 may adjust the battery utilization instructions computed for controlling one or more of the rechargeable batteries 116 according to one or more traffic conditions applicable and/or reported for the geographical area of the trips defined by the travel plan, for example, a traffic load, a traffic jam, a construction area, a detour, a car accident and/or the like.

The logistics manager 840 may communicate with one or more traffic monitoring systems to receive the traffic information. The logistics manager 840 may then adjust the energy consumption requirements according based on traffic condition(s) estimated and/or predicted for one or more of the trips. For example, assuming that based on analysis of the traffic information, the logistics manager 840 identifies that one or more locations in the geographical area of the trip typically suffer heavy traffic load at one or more times of the day (e.g. rush hour). In such case, the logistics manager 840 may estimate that one or more trips whose route intersects and/or affected by the heavy traffic load location(s) and are scheduled for the heavy traffic load time(s) of day may be prolonged and thus require more energy which may increase the energy consumption requirements for one or more of the electric vehicles 102 assigned to this trip(s). The logistics manager 840 may transmit the adjusted energy consumption requirements to the battery manager 820 which may determine that due to the increased energy consumption requirements, one or more rechargeable batteries 116 powering the respective electric vehicles 102 assigned for this trip(s) may be faster drained. The battery manager 820 may therefore adjust the battery utilization instructions for the respective rechargeable battery(s) 116 accordingly.

In another example, the battery manager 820 may adjust the battery utilization instructions computed for controlling one or more of the rechargeable batteries 116 according to one or more environmental conditions applicable and/or reported for the geographical area of the trips defined by the travel plan, for example, weather conditions, visibility conditions and/or the like. For example, the logistics manager 840 may communicate with one or more online weather services and/or systems to receive weather information comprising one or more weather conditions estimated for the certain geographical area during the future time period defined by the travel plan, for example, rain, snow, fog and/or the like. In another example, the logistics manager 840 may communicate with one or more online environment monitoring services and/or systems to receive environmental information comprising one or more visibility conditions estimated for the certain geographical area during the future time period defined by the travel plan, for example, smog and/or the like.

The logistics manager 840 may then adjust the energy consumption requirements based on environmental condition(s) estimated and/or predicted for one or more geographical locations of one or more of the trips. For example, assuming that based on the received weather information, specifically a weather forecast, the logistics manager 840 determines that heavy rain is expected at one or more locations in the geographical area at one or more times during the future time period defined by the travel plan. In such case, the logistics manager 840 may estimate that one or more trips whose route intersects with the rainy location(s) and are scheduled for the rainy time(s) may be prolonged and thus require more energy which may increase the energy consumption requirements for one or more of the electric vehicles 102 assigned to this trip(s). The logistics manager 840 may transmit the adjusted energy consumption requirements to the battery manager 820 which may determine that due to the increased energy consumption requirements, one or more rechargeable batteries 116 the respective electric vehicle(s) 102 assigned for this trip(s) may be faster drained. The battery manager 820 may therefore adjust the battery utilization instructions for the respective rechargeable battery(s) 116 accordingly. In another example, assuming that based on the received environmental information, the logistics manager 840 determines that heavy smog is expected at one or more locations in the geographical area of one or more of the trips defined by the travel plan. In such case, the logistics manager 840 may estimate that one or more trips whose route intersects with the smoggy location (s) may be prolonged and thus require more energy which may increase the energy consumption requirements for one or more of the electric vehicles 102 assigned to this trip(s). The logistics manager 840 may transmit the adjusted energy consumption requirements to the battery manager 820 which may determine that due to the increased energy consumption requirements, one or more rechargeable batteries 116 powering the respective electric vehicle(s) 102 assigned for this trip(s) may be faster drained. The battery manager 820 may therefore adjust the battery utilization instructions for the respective rechargeable battery(s) 116 accordingly.

In another example, the battery manager 820 may adjust the battery utilization instructions computed for controlling one or more of the rechargeable batteries 116 according to a one or more operational parameters learned for the respective rechargeable battery 116 over time. The battery manager 820 may learn the usage and/or charging patterns of one or more of the plurality of rechargeable batteries 116 which may typically deviate at least to some degree from the nominal value(s) stated for the respective rechargeable battery 116. The usage and/or charging patterns may include, for example, a typical energy deflation rate, a typical output current, a maximal output current, a typical voltage level, a maximal voltage level, a typical charging rate, a charging time and/or the like. The battery manager 820 may learn the usage and/or charging patterns of one or more of the plurality of rechargeable batteries 116 by analyzing battery usage and charging information collected in real-time in a plurality of trips conducted by one or more of the electric vehicles 102 while powered by the respective rechargeable battery(s) 116 and/or charging information collected in real-time the respective rechargeable battery(s) 116 while charged by one or more of the chargers deployed at one or more of the charging sites 810.

The battery manager 820 may further use one or more ML models for example, a neural network, a Support Vector Machine (SVM) and/or the like to learn the battery usage and/or charging patterns and/or operational parameters typical to one or more of the rechargeable batteries 116. The ML model(s) which may be trained with the real-time battery usage and charging information collected for the rechargeable battery(s) 116 may further evolve and adjust according to additional battery usage and charging information collected in real-time for the rechargeable battery(s) 116 while used in one or more additional trips and/or while recharged by one or more of the chargers.

The battery manager 820 may then adjust the battery utilization instructions for one or more of the rechargeable batteries 116 according to the usage and/or recharge patters of the respective rechargeable battery(s) 116. For example, assuming that a certain rechargeable battery 116 is identified to store, in fully recharged state, significantly less energy compared to the nominal energy capacity. In such case, the battery manager 820 may estimate that, due to the reduced energy capacity of the certain rechargeable battery 116, the energy of the certain rechargeable battery 116 may be insufficient to power a certain electric vehicle 102 during a certain trip assigned to the certain electric vehicle 102. The battery manager 820 may therefore adjust the battery utilization instructions to indicate installing at least another one of the rechargeable batteries 116 in the electric vehicle 102 for the certain trip.

As shown at 706, while the plurality of vehicles 102 are operated to conduct the trips defined in the travel plan, the battery manager 820 may receive real-time battery status of each of the plurality of rechargeable batteries 116 which is either installed in one of the plurality of electric vehicles 102 or located in one of the charging sites 810, specifically being charged or completed charging and available for installation in one of the electric vehicle 102.

The battery manager 820 may receive the real-time battery status of one or more rechargeable batteries 116 installed in the electric vehicles by communicating with the battery controller 112 installed in each of the electric vehicles 102 to control the operation of each rechargeable battery 116 installed in the respective electric vehicle 102. As described herein before, the real-time battery status received from the battery controller 112 may include one or more battery parameters of each rechargeable battery 116 installed in the respective electric vehicle. The battery parameters may include, for example, the energy level of the respective rechargeable battery 116, the voltage level of the rechargeable battery 116, the current level of the rechargeable battery 116 and/or the like, the usage pattern of the respective rechargeable battery 116, the recharge pattern of the respective rechargeable battery 116 and/or the like.

The battery manager 820 may receive the real-time battery status of one or more rechargeable batteries 116 located at one or more of the charging sites 810 by communicating with one or more of the charging sites 810. For example, the battery manager 820 may communicate with one or more maintenance operators operating the respective charging site 810 and using client devices (e.g. compute, Smartphone, tablet, etc.) to connect to the network 120 and communicate with the battery management system 130. In another example, the battery manager 820 may communicate with one or more automated control systems deployed in the respective charging site 810 to control the charger(s) in the respective charging site 810 and optionally to control the automated system(s) capable of installing and/or removing rechargeable batteries 116 into and/or out of an electric vehicle 102.

The real-time battery status received from each charging site 810 for each rechargeable battery 116 currently located at the respective charging site 810 may include one or more of the battery parameters described herein before, for example, the energy level of the respective rechargeable battery 116, the voltage level of the rechargeable battery 116, the current level of the rechargeable battery 116, the recharge pattern of the respective rechargeable battery 116 and/or the like.

However, the real-time battery status received from each charging site 810 may also include additional information relating to one or more of the rechargeable batteries 116 currently located at the respective charging site 810. The additional information may include, for example, indication that the respective rechargeable battery 116 is fully charged and ready for installation in an electric vehicle 102, indication that the respective rechargeable battery 116 is waiting in queue for charging by a charger currently not available, an estimated time for starting recharging the respective rechargeable battery 116, indication that the respective rechargeable battery 116 is faulty and thus non-operational and/or the like. In another example, the additional battery status received from one or more of the charging sites 810 may include information relating to one or more chargers deployed at the respective charging site 810, for example, availability of chargers, operational state (e.g. fully functional, partially functional fault, etc.) of one or more of the chargers, a queue of rechargeable batteries 116 waiting to be charged by each of one or more chargers and/or the like. In another example, the additional battery status received from one or more of the charging sites 810 may include information relating to one or more of the operators operating the respective charging site 810, for example, availability of the maintenance persons operating the respective charging site 810.

As shown at 708, the battery manager 820 may adjust the battery utilization instructions for controlling, i.e., using and/or recharging each of the plurality of rechargeable batteries 116 based on the real-time battery status received from one or more of the electric vehicles 102 and/or from one or more of the charging sites 810.

For example, assuming that, based on analysis of the received real-time battery status, the battery manager 820 determines that the voltage level of a certain rechargeable battery 116 installed in a certain electric vehicle 102 exceeds (is below) a minimum voltage value recommended for the respective rechargeable battery 116. In such case, the battery manager 820 may adjust the battery utilization instructions to instruct using one or more other rechargeable batteries 116 installed in the certain electric vehicle 102 to power the electric engine 118 of the certain electric vehicle 102. The battery manager 820 may further adjust the battery utilization instructions to instruct recharging the certain rechargeable battery 116 from one or more of the other rechargeable batteries 116 installed in the certain electric vehicle 102 and/or from the electric engine 118 of the certain electric vehicle 102.

In another example, assuming that, based on analysis of the received real-time battery status, the battery manager 820 determines that a certain rechargeable battery 116 installed in a certain electric vehicle 102 is faulty and unusable. In such case, the battery manager 820 may adjust the battery utilization instructions to instruct removing the certain rechargeable battery 116 from the certain electric vehicle 102 when the certain electric vehicle 102 next arrives at one of the charging sites 810. The battery manager 820 may further adjust the battery utilization instructions to instruct installing one or more other rechargeable batteries 116 instead of the certain rechargeable battery 116 in one or more electric vehicles 102 in which the certain rechargeable battery 116 was initially instructed to be installed.

In another example, assuming that, based on analysis of the received real-time battery status, the battery manager 820 determines that a certain charger deployed at a certain charging site 810 is faulty and unusable. In such case, the battery manager 820 may adjust the battery utilization instructions to instruct recharging one or more certain rechargeable batteries 116, initially planned to recharge from the faulty charger, from one or more other chargers deployed in the certain charging site 810 and/or in one or more other charging sites 810. In another example, the battery manager 820 may adjust the battery utilization instructions to instruct recharging one or more certain rechargeable batteries 116, initially planned to recharge from the faulty charger, while installed in one or more of the electric vehicles 102.

Optionally, the battery manager 820 may adjust the battery utilization instructions for one or more of the rechargeable batteries 116 according to one or more trip attributes, characteristics, attributes and/or conditions (collectively designated attributes herein after) identified in real-time for one or more of the trips. The trip attributes may include, for example, a driving pattern of one or more of the drivers driving and/or operating one or more of the electric vehicles 102 to carry out one or more of the trips defined by the travel plan. The driving pattern of the driver(s) may be identified by analyzing driving information, for example, speed, acceleration events, deceleration events, breaking events and/or the like captured in real time from by one or more sensors installed and/or mounted in one or more electric vehicles 102 and/or by analyzing continuous geolocation data captured for one or more of the electric vehicles 102 by one or more of the tracking systems. In another example, the trip attributes may include one or more of the traffic conditions identified in real-time for one or more of the trips. In another example, the trip attributes may include one or more of the traffic conditions identified in real-time for one or more of the trips. In another example, the trip attributes may include one or more of the environmental conditions identified in real-time for one or more of the trips.

For example, assuming that the battery manager 820 identifies, based on analysis of the driving information collected in real-time for a certain driver, that the certain driver driving on a certain trip is driving a certain electric vehicle 102 at a slower speed compared to an average speed typically applied in the certain trip. In such case, the drain battery manager 820 may determine that the certain trip may be prolonged and may thus require more energy which may faster drain a certain rechargeable battery 116 powering the certain electric vehicle 102. In such case, the battery manager 820 may adjust the battery utilization instructions accordingly, for example, instruct using one or more other rechargeable batteries 116 installed in the certain electric vehicle 102 to power the certain electric vehicle 102 during at least part of the certain trip.

In another example, assuming that the battery manager 820 identifies, based on analysis of the traffic conditions, that a certain electric vehicle 102 conducting a certain trip enters a heavy traffic location which may significantly prolong the time of the certain trip and may thus require more energy which may faster drain a certain rechargeable battery 116 powering the certain electric vehicle 102. In such case, the battery manager 820 may adjust the battery utilization instructions accordingly, for example, instruct using the certain rechargeable battery 116 according to a different usage pattern which is less energy consuming.

In another example, assuming that the battery manager 820 identifies, based on analysis of the weather conditions, that a certain electric vehicle 102 conducting a certain trip enters a heavy rain location which may force during at significantly lower speed and thus may significantly prolong the time of the certain trip which may translate to increased energy consumption which may faster drain a certain rechargeable battery 116 powering the certain electric vehicle 102. The battery manager 820 may therefore adjust the battery utilization instructions accordingly, for example, instruct using the certain rechargeable battery 116 according to a different usage pattern which is less energy consuming.

As shown at 710, the battery manager 820 may transmit the battery utilization instructions to the battery controllers 112 installed in the electric vehicles 102 and/or to the charging sites 810. The battery controllers 112 installed in each of the electric vehicles 102 may apply the received battery utilization instructions as described in step 604 of the process 600.

The battery manager 820 may further adjust and/or update the battery utilization instructions according to newly received real-time battery status and optionally based on one or more newly identified trip attributes. As seen, the process 700 may branch back to step 706 to receive new real-time battery status and optionally updated trip attributes. The battery manager 820 may then adjust and/or update the battery utilization instructions for controlling one or more of the rechargeable batteries 116 as described in step 708.

The battery manager 820 may adjust and/or update the battery utilization instructions in one or more operation modes. For example, the battery manager 820 may continuously analyze the new battery status and/or updated trip attributes and adjust the battery utilization instructions accordingly. In another example, the battery manager 820 may periodically analyze the new battery status and/or updated trip attributes and adjust the battery utilization instructions accordingly, for example, every minute, every five minutes, and/or the like. In another example, the battery manager 820 may adjust the battery utilization instructions on detection of one or more predefined events identified by analyzing the new battery status and/or updated trip attributes, for example, a received indication of a faulty rechargeable battery 116 requiring replacing the faulty rechargeable battery 116 with another faulty rechargeable battery 116, a received report of a car accident requiring alteration of the route of one or more trips and/or the like. In another example, the battery manager 820 may adjust the battery utilization instructions on demand and/or instruction of one or more operators of the battery management system 130.

According to some embodiments of the present invention, there are provided systems and methods for optimizing deployment of replaceable rechargeable batteries 116 required to power a fleet of electric vehicles 102. In particular, given a certain estimated travel plan (work assignment), a number of electric vehicles 102 of the fleet and information relating to the charging sites 810 (e.g. location, capacity, etc.), an optimal number of rechargeable batteries 116 and an optimal number of chargers required for recharging the rechargeable batteries 116 may be determined to reduce cost of the battery deployment.

Figure 9:
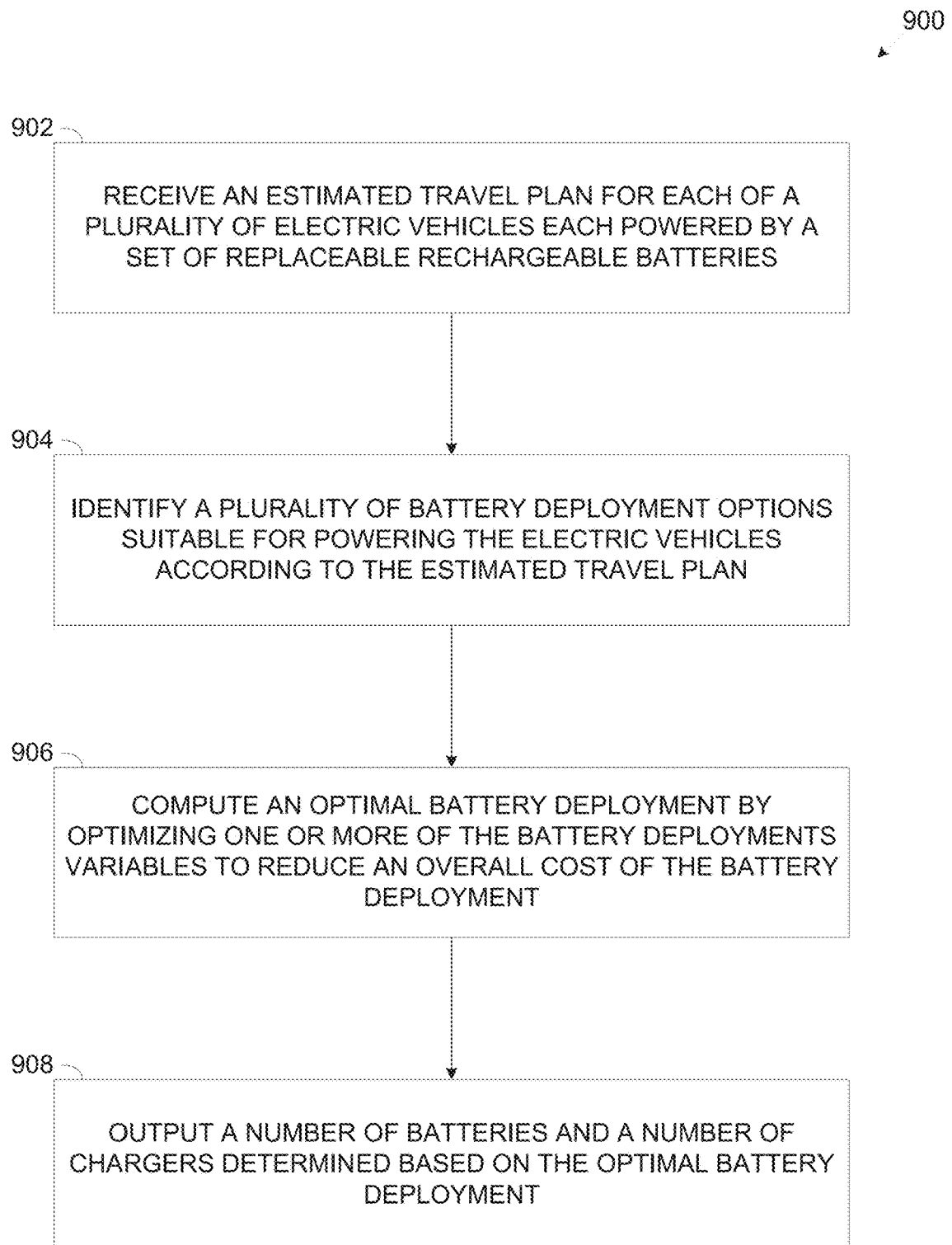
FIG. 9 is a flowchart of an exemplary process of optimizing a deployment of rechargeable batteries powering a fleet of electric vehicles, according to some embodiments of the present invention.

Reference is now made to FIG. 9, which is a flowchart of an exemplary process of optimizing a deployment of rechargeable batteries powering a fleet of electric vehicles, according to some embodiments of the present invention. An exemplary process 900 may be executed by a battery management system such as the battery management system 130 executing a battery manager such as the battery manager 820 to identify an optimal battery deployment configuration of rechargeable batteries such as the rechargeable batteries 116 for powering a fleet of electric vehicles such as the electric vehicle 102.

As seen at 902, the process 900 starts with the battery manager 820 receiving an estimated travel plan which may express an estimated work assignment (load) and defines an expected number of trips planned for the plurality of electric vehicle 102, a route of each trip, a schedule of each trip over a predefined time period, and a location of one or more charging sites such as the charging site 810. In particular, the estimated travel plan may express an estimated work assignment for a future time period specifically an extended time period for example, a week, a month, a year, three years and/or the like which may be a typical and/or an averaged work assignment.

The estimated travel plan may therefore specify the number of electric vehicle 102 available to conduct the trips defined by the estimated travel plan. The estimated travel plan may further specify the battery capacity of each of the electric vehicles 102 in terms of how many rechargeable batteries 116 may be simultaneously installed in each electric vehicle 102, energy consumption ratings of each electric vehicle 102, in-vehicle recharging capabilities of each electric vehicle 102, a maximum range and/or the like. In addition, the travel plan may specify the number of the charging sites 810 available for hosting chargers for recharging the rechargeable batteries 116 and the location of each such charging site 810.

The estimated travel plan may define at least some trip parameters of each of the trips planned for the plurality of electric vehicle 102 during the future time period, for example, a route (expressing path and distance) of each trip, an estimated schedule of each trip and/or the like. The travel plan may further include one or more additional trip parameters applicable for one or more of the trips planned for one or more of the electric vehicles 102, for example, a weight of cargo estimated to be loaded on the respective electric vehicle 102 in the respective trip, one or more stops planned along the route of the respective trip and/or the like.

For example, assuming the fleet comprises a plurality of food delivery electric scooters such as the electric vehicles 102 each powered by a set of rechargeable batteries 116 which are used by a food company to deliver food from three restaurants. The three restaurants are located in predefined and known locations within a certain geographical area which is sufficiently limited to allow the electric scooters to travel between the restaurants. Moreover, each of the restaurants may serve as a charging site 810 and may be deployed with one or more chargers suitable for charging the rechargeable batteries 116 used by the electric scooters. In such case, the estimated travel plan may define the number of available electric scooters as well as the number and location of the restaurants. The estimated travel plan may also define the number of food delivery trips typically served every day, every week, every month and/or the like, including the trip parameters of each of the food delivery trips.

In another example, assuming the fleet comprises a plurality of item delivery electric drones such as the electric vehicles 102 each powered by a set of rechargeable batteries 116 which are used by a delivery company to deliver items from five distribution centers. The five distribution centers are located in predefined and known locations within a certain geographical area which is sufficiently limited to allow the electric drones to travel between at least some of the distribution centers. Moreover, each of the distribution centers may serve as a charging site 810 and may be deployed with one or more chargers suitable for charging the rechargeable batteries 116 used by the electric drones. In such case, the estimated travel plan may define the number of available electric drones as well as the number and location of the distribution centers. The estimated travel plan may also define the number of item delivery trips typically served every day, every week, every month and/or the like, including the trip parameters of each of the item delivery trips.

As shown at 904, the battery manager 820 may identify a plurality of battery deployment configurations each defining a certain number of rechargeable batteries 116 and a certain number of chargers which are sufficient for powering the electric vehicles 102 to successfully conduct the trips defined by the estimated travel plan.

The battery manager 820 may first analyze the estimated travel plan to extract availability of the fixed and predefined resources, specifically, availability of the electric vehicles 102 (number, capacity, etc.) and the availability of the charging sites 810 (number, location, capacity, etc.). The battery manager 820 may further analyze the work assignment defined by the estimate travel plan, specifically the routes and schedules of the plurality of trips.

The battery manager 820 may then identify one or more battery deployment configurations to identify one or more suitable battery deployment configurations which are suitable to support the estimated travel plan, i.e., defining sufficient rechargeable batteries 116 and chargers to power the electric vehicles 102 to conduct the trips using the charging sites 810 as defined by the estimated travel plan.

This step is very similar to the creation of the resources allocation configurations described in step 704 of the process 700 with one major difference. In the process 700, the travel plan explicitly specifies the number of rechargeable batteries 116 available to power the fleet of electric vehicles as well as the number of one or more chargers available at one or more charging sites 810 to recharge the rechargeable batteries 116. Predefining a fixed number of rechargeable batteries 116 and a fixed number of chargers may significantly limit the flexibility and selection space available to the battery manager 820 in exploring possible resource allocation configurations. In contrast, the estimated travel plan does not explicitly specify the number of available rechargeable batteries 116 and the number of available chargers but only the number of electric vehicles 102 available to conduct the defined trips (and their capacity) as well as the number and locations of the charging sites 810. The values for these variables, namely the number of rechargeable batteries 116 and the number of chargers, are therefore free which may significantly increase the battery deployment configurations space which may be explored by the battery manager 820.

The battery manager 820 may explore the battery deployment configurations space to identify and select one or more battery deployment configurations which are suitable to support the trips, using the electric vehicles 102 and the charging sites defined by the estimated travel plan.

The identified battery deployment configurations suitable to support the estimated travel plan may be therefore regarded as the resource allocation configurations described in step 704 of the process 700. The battery manager 820 may therefore further derive one or more usage scenarios from the one or more suitable battery deployment configurations as described in step 704 of the process 700.

As shown at 906, the battery manager 820 may compute an optimal battery deployment configuration based on one or more of the suitable battery deployment configurations, specifically based on the plurality of usage scenarios derived from the suitable battery deployment configurations.

For example, the battery manager 820 may simulate the plurality of usage scenarios derived from the suitable battery deployment configurations similarly to the simulation described in step 704 of the process 700. Specifically, for each suitable battery deployment configuration, the battery manager 820 may simulate the battery utilization, specifically an energy consumption and a battery degradation of each rechargeable battery 116 based on the expected usage of the respective rechargeable battery 116 as identified in a respective usage scenario derived from the respective battery deployment configuration. To this end, as described in step 704 of the process 700, the battery manager 820 may simulate the operational parameters applied to (experienced by) each of the rechargeable batteries 116 according to the respective usage scenario, for example, energy consumption, overall usage time, continuous usage time, levels of drawn current, recharge time, recharge current, recharge voltage, operation within the nominal operational parameters or exceeding them and/or the like. By simulating the operational parameters under which each rechargeable battery 116 is expected to operate, the battery manager 820 may estimate the battery degradation of each of the plurality of rechargeable batteries 116.

Again, as described in step 704 of the process 700, the battery manager 820 may further translate the battery degradation of each of the plurality of rechargeable batteries 116 to cost values according to one or more of the cost vs. use metrics applied to compute an expected cost of the respective battery deployment configuration. For example, the battery manager 820 may compute the cost of the rechargeable batteries 116 and the chargers defined by the respective battery deployment configuration, the cost of energy drawn from each of the rechargeable batteries 116 to power the electric vehicles 102, a maintenance cost of the rechargeable batteries 116, a cost of wear due to degradation of the rechargeable batteries 116 and/or the chargers and/or the like. The maintenance cost may be expressed and/or computed based on one or more of the cost parameters, for example, the cost of electricity drawn by the chargers from the electric grid to recharge the rechargeable batteries 116, the cost of operating the chargers, the cost for installing and removing the rechargeable batteries 116 in and out of the electric vehicles and/or the like. The cost parameters may further include the life expectancy of one or more of the rechargeable batteries 116 which may be translated to cost per use. Moreover, the battery manager 820 may compute the cost for using the rechargeable batteries 116 according to the simulated usage scenarios based on one or more objective functions which may be optionally defined by an operator of the fleet of electrical vehicles 102.

Based on the simulation, the battery manager 820 may identify one or more usage scenarios which present best battery utilization, in particular in terms of cost, for example, reduced purchase cost, reduced initial purchase and/or deployment cost (cost of rechargeable batteries 116 and chargers and/or cost for installing them), lower maintenance cost (which may be expressed by increased longevity, reduced depreciation, etc.), energy cost (e.g. per unit cost of energy stored in the rechargeable batteries 116) and/or the like.

The battery manager 820 may further optimize one or more of the usage scenarios to increase the battery utilization of the rechargeable batteries 116, specifically to reduce the cost of one or more of the battery deployment configurations from which the respective usage scenarios are derived. The battery manager 820 may optimize one or more of the usage scenarios according to one or more objective functions, for example, a cost objective function, a battery preservation function, a combination thereof and/or the like. Moreover, the battery manager 820 may apply one or more multi-objective optimization algorithms, functions, tools and/or the like to optimize one or more of the usage scenarios based on one or more multiple objective functions each directed to optimize a certain aspect of the battery utilization, for example, minimal number of rechargeable batteries 116, minimal number of chargers, minimal overall cost of the battery deployment configuration(s), minimal maintenance cost of the battery deployment configuration (s), a minimal depreciation and/or the like.

The battery manager 820 may then compute, identify and/or otherwise select an optimal usage scenario, accordingly identify and select the optimal battery deployment configuration associated with the optimal usage scenario and obtain (extract) the number of rechargeable batteries 116 and the number of chargers defined by the optimal battery deployment configuration.

As shown at 908, the battery manager 820 may output the number of rechargeable batteries 116 and the number of chargers defined by the selected optimal battery deployment configuration.

The selected battery deployment configuration, specifically, the number of rechargeable batteries 116 and the number of chargers may be used by a fleet operator aiming to operate the fleet of electric vehicles 102 according to the estimated travel plan may sue the selected battery deployment configuration to equip the fleet with the number of rechargeable batteries 116 and the number of chargers defined by the selected battery deployment configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms electric vehicle is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of optimizing utilization of replaceable rechargeable batteries used by a fleet of electric vehicles, comprising:

using at least one processor of a battery management system for:

receiving a travel plan of each of a plurality of electric vehicles of a fleet defining at least a route and a scheduled time of each trip assigned for the respective electric vehicle during a certain time period, each electric vehicle is powered by a set of replaceable rechargeable batteries installed in the respective electric vehicle, each of the replaceable rechargeable batteries is interchangeable between at least some of the plurality of electric vehicles and is rechargeable in each of a plurality of charging sites;

computing a plurality of resources allocation configurations each defining a respective allocation of the plurality of replaceable rechargeable batteries to the plurality of electric vehicles for conducting the plurality of trips defined by the travel plan and charging the replaceable rechargeable batteries at the plurality of charging sites, wherein an electric vehicle arriving at a charging site for service gets its replaceable rechargeable batteries pulled out and replaced with charged replaceable rechargeable batteries;

deriving a plurality of usage scenarios each from a respective one of the plurality of resources allocation configurations, each usage scenario reflects usage and/or recharge of each of the plurality of replaceable rechargeable batteries;

selecting an optimal usage scenario of the plurality of usage scenarios;

computing battery utilization instructions for using and/or recharging each of the plurality of replaceable rechargeable batteries according to the optimal usage scenario; and transmitting the battery utilization instructions, via at least one network, to the electric vehicles and/or to the charging sites which are configured to conduct the plurality of trips according to the battery utilization instructions expressing the optimal usage scenario to optimize utilization of the plurality of replaceable rechargeable batteries.

2. The method of claim 1, wherein the battery utilization instructions received for using a respective replaceable rechargeable battery include instructions to use the respective replaceable rechargeable battery for powering the electric vehicle according to at least one usage rule.

3. The method of claim 1, wherein the battery utilization instructions received for recharging a respective replaceable rechargeable battery include instructions to recharge the respective replaceable rechargeable battery from at least another one of the plurality of batteries according to at least one charging rule.

4. The method of claim 1, wherein the battery utilization instructions received for recharging a respective replaceable rechargeable battery include instructions to recharge the respective replaceable rechargeable battery from an engine of the electric vehicle.

5. The method of claim 1, wherein the battery utilization instructions comprise respective instructions for each of the plurality of replaceable rechargeable batteries.

6. The method of claim 1, further comprising receiving real-time battery status information for each replaceable rechargeable battery installed in at least one of the plurality of electric vehicles, the real-time battery status is collected by a battery controller deployed in each of the plurality of electric vehicles to control and monitor the replaceable rechargeable battery installed in the respective electric vehicle.

7. The method of claim 1, wherein the set of replaceable rechargeable batteries comprises multiple replaceable rechargeable batteries.

8. The method of claim 1, further comprising at least one of the plurality of replaceable rechargeable batteries is rechargeable while installed in a respective electric vehicle from at least one of: at least one another battery installed in the same electric vehicle and from an engine of the same electric vehicle.

9. The method of claim 1, wherein each of the plurality of electric vehicles comprises a local battery controller configured to execute the battery utilization instructions for controlling usage and recharging of each replaceable rechargeable battery of the set installed in the respective electric vehicle.

10. The method of claim 1, wherein the battery utilization instructions computed for using a respective replaceable rechargeable battery include at least one of: instructions to install the respective replaceable rechargeable battery in one of the plurality of electric vehicles, instructions to pull out the respective replaceable rechargeable battery from one of the plurality of electric vehicles, instructions to swap the respective replaceable rechargeable battery between two or more of the plurality of electric vehicles, and instructions to use the respective replaceable rechargeable battery according to at least one usage rule.

11. The method of claim 1, wherein the battery utilization instructions computed for recharging a respective replaceable rechargeable battery include at least one of: instructions indicating one of the plurality of charging sites selected for recharging the respective replaceable rechargeable battery, instructions indicating a respective charger in the selected charging site selected to recharge the respective replaceable rechargeable battery, instructions to recharge the respective replaceable rechargeable battery installed in a respective electric vehicle from at least one another replaceable rechargeable battery installed in the same electric vehicle, instructions to recharge the respective replaceable rechargeable battery installed in a respective electric vehicle from an engine of the same electric vehicle, and instructions for recharging the respective replaceable rechargeable battery according to at least one charging rule.

12. The method of claim 1, wherein the battery utilization instructions further comprise instructions to transfer at least one of the plurality of replaceable rechargeable batteries from one of the plurality of charging sites to another one of the plurality of charging sites.

13. The method of claim 1, further comprising computing and transmitting updated battery utilization instructions according to battery status received from at least one of the plurality of electric vehicles with respect to at least one replaceable rechargeable battery installed in the at least one electric vehicle.

14. The method of claim 1, wherein each of the plurality of trips starts in one of the plurality of charging sites and ends in one of the plurality of charging sites.

15. The method of claim 1, wherein the optimal usage scenario optimizes utilization of at least some of the plurality of replaceable rechargeable batteries by at least one of: reducing a number of recharge cycles of at least one of the plurality of replaceable rechargeable batteries, not exceeding a maximum voltage level in at least one of the plurality of replaceable rechargeable batteries, not exceeding a minimum voltage level in at least one of the plurality of replaceable rechargeable batteries and reducing a maintenance cost of the plurality of replaceable rechargeable batteries.

16. The method of claim 1, further comprising adjusting the battery utilization instructions computed for at least one of the plurality of replaceable rechargeable batteries based on at least one driving pattern of at least one of the plurality of electric vehicles.

17. The method of claim 1, further comprising computing and transmitting updated battery utilization instructions for at least one of the plurality of replaceable rechargeable batteries based on at least one traffic condition reported along a route of at least one trip assigned to at least one of the plurality of electric vehicles.

18. The method of claim 1, further comprising computing and transmitting updated battery utilization instructions for at least one of the plurality of replaceable rechargeable batteries based on availability of maintenance personnel capable to apply the battery utilization instructions.

19. The method of claim 1, further comprising computing and transmitting updated battery utilization instructions for at least one of the plurality of replaceable rechargeable batteries based on at least one energy consumption parameter of power source in at least one of the plurality of charging sites.

20. The method of claim 1, further comprising computing and transmitting updated battery utilization instructions for at least one of the plurality of replaceable rechargeable batteries based on at least one environmental condition reported for a geographical area of at least one trip assigned to at least one of the plurality of electric vehicles.

21. The method of claim 1, further comprising computing and transmitting updated battery utilization instructions for at least one of the plurality of replaceable rechargeable batteries based on at least one operational parameter of the at least one replaceable rechargeable battery learned using at least one Machine Learning (ML) model applied to the real-time status information of the at least one battery.

22. The method of claim 1, wherein each of the plurality of electric vehicles is a member of a group consisting of: a ground vehicle, an aerial vehicle and a naval vehicle.

23. The method of claim 1, wherein the plurality of usage scenarios are simulated based on a availability of a plurality of resources of the fleet.

24. The method of claim 23, wherein the plurality of resources comprise electric vehicles, replaceable rechargeable batteries, recharging sites, and chargers deployed at the recharging sites.

25. A system for optimizing utilization of replaceable rechargeable batteries used by a fleet of electric vehicles, comprising:
at least one processor of a battery management system configured for executing a code, the code comprising:
code instructions to receive a travel plan of each of a plurality of electric vehicles of a fleet defining at least a route and a scheduled time of each trip assigned for the respective electric vehicle during a certain time period, each electric vehicle is powered by a set of replaceable rechargeable batteries installed in the respective electric vehicle, each of the replaceable rechargeable batteries of the set is interchangeable between at least some of the plurality of electric vehicles and is rechargeable in each of a plurality of charging sites;
code instructions to compute a plurality of resources allocation configurations each defining a respective allocation of the plurality of replaceable rechargeable batteries to the plurality of electric vehicles for conducting the plurality of trips defined by the travel plan and charging of the replaceable rechargeable batteries at the plurality of charging sites, wherein an electric vehicle arriving at a charging site for service gets its replaceable rechargeable batteries pulled out and replaced with charged replaceable rechargeable batteries;
code instructions to derive a plurality of usage scenarios each from a respective one of the plurality of resources allocation configurations, each usage scenario reflects usage and/or recharge of each of the plurality of replaceable rechargeable batteries;
code instructions to select an optimal usage scenario of the plurality of usage scenarios;
code instructions to compute battery utilization instructions for using and/or recharging each of the plurality of replaceable rechargeable batteries according to the optimal usage; and
code instructions to transmit the battery utilization instructions, via at least one network, to the electric vehicles and/or to the charging sites which are configured to conduct the plurality of trips according to the battery utilization instructions expressing the optimal usage scenario to optimize utilization of the plurality of replaceable rechargeable batteries.

26. A method of optimizing deployment of replaceable rechargeable batteries powering a fleet of electric vehicles, comprising:
using at least one processor of a battery management system for:
receiving an estimated travel plan defining an expected number of trips planned for a plurality of electric vehicles, a route of each trip, a schedule of each trip over a predefined time period, and a location of at least one charging site;
computing a plurality of battery deployment configurations each defining a certain number of replaceable rechargeable batteries allocated to a plurality of electric vehicle for conducting the trips defined by the estimated travel plan and a certain number of chargers for charging the replaceable rechargeable batteries, each of the replaceable rechargeable batteries is interchangeable between at least some of the plurality of electric vehicles such that each electric vehicle arriving at the at least one charging site for service gets its replaceable rechargeable batteries pulled out and replaced with charged replaceable rechargeable batteries;
deriving a plurality of usage scenarios each from a respective one of the plurality of battery allocation configurations, each usage scenario reflects usage and/or recharge of each of the number of replaceable rechargeable batteries defined by the respective battery allocation configuration;
selecting an optimal battery deployment configuration by applying at least one optimization function to optimize at least one variable defining the battery deployment configurations in the usage scenarios in order to reduce an overall cost of the battery deployment configurations, the at least one variable comprising: a number of replaceable rechargeable batteries and a number of chargers in the at least one charging site; and
outputting the optimal battery deployment configuration which is used to conduct the trips at a reduced overall cost by operating the plurality of electric vehicles according to the usage scenario derived from the optimal battery deployment configuration using an optimal number of replaceable rechargeable batteries and chargers defined by the optimal battery deployment configuration and charging at least some of the replaceable rechargeable batteries using the optimal number of chargers deployed in the at least one charging site.

27. A system for optimizing deployment of replaceable rechargeable batteries powering a fleet of electric vehicles, comprising:
at least one processor of a battery management system configured for executing a code, the code comprising:
code instructions to receive an estimated travel plan defining an expected number of trips planned for a plurality of electric vehicle, a route of each trip, a schedule of each trip over a predefined time period, and a location of at least one charging site;
code instructions to compute a plurality of battery deployment configurations defining a certain number of replaceable rechargeable batteries allocated to a plurality of electric vehicle for conducting the trips defined by the estimated travel plan and a certain number of chargers for charging the replaceable rechargeable batteries, each of the plurality of replaceable rechargeable batteries is interchangeable between at least some of the plurality of electric vehicles such that each electric vehicle arriving at the at least one charging site for service gets its replaceable rechargeable batteries pulled out and replaced with charged replaceable rechargeable batteries;
code instructions to derive a plurality of usage scenarios each from a respective one of the plurality of battery allocation configurations, each usage scenario reflects usage and/or recharge of each of the number of replaceable rechargeable batteries defined by the respective battery allocation configuration;
code instructions to select an optimal battery deployment configuration by applying at least one optimization function to optimize at least one variable defining the battery deployment configurations in the usage scenarios in order to reduce an overall cost of the battery deployment configurations, the at least one variable comprising: a number of replaceable rechargeable batteries and a number of chargers in the at least one charging site; and code instructions to output the optimal battery deployment configuration which is used to conduct the trips at a reduced overall cost by operating the plurality of electric vehicles according to the usage scenario derived from the optimal battery deployment configuration using an optimal number of replaceable rechargeable batteries and chargers defined by the optimal battery deployment configuration and charging at least some of the replaceable rechargeable batteries using the optimal number of chargers deployed in the at least one charging site.

* * * * *